(12) United States Patent
Zhu et al.

(10) Patent No.: US 12,174,919 B2
(45) Date of Patent: Dec. 24, 2024

(54) METHOD AND APPARATUS FOR CONTROLLING SMART DEVICE TO PERFORM CORRESPONDING OPERATIONS

(71) Applicant: Samsung Electronics Co., Ltd., Gyeonggi-do (KR)

(72) Inventors: Bo Zhu, Beijing (CN); Haixiao Liu, Beijing (CN); Xiaoyan Lou, Beijing (CN)

(73) Assignee: Samsung Electronics Co., Ltd (KR)

( * ) Notice: Subject to any disclaimer, the term of this patent is extended or adjusted under 35 U.S.C. 154(b) by 591 days.

(21) Appl. No.: 17/417,667

(22) PCT Filed: Dec. 24, 2019

(86) PCT No.: PCT/KR2019/018392
§ 371 (c)(1),
(2) Date: Jun. 23, 2021

(87) PCT Pub. No.: WO2020/138911
PCT Pub. Date: Jul. 2, 2020

(65) Prior Publication Data
US 2022/0012547 A1    Jan. 13, 2022

(30) Foreign Application Priority Data

Dec. 24, 2018 (CN) .......................... 201811585137.2
Apr. 3, 2019 (CN) .......................... 201910267629.5

(51) Int. Cl.
*G06F 18/2411* (2023.01)
*H04M 1/72415* (2021.01)
*H04M 1/72454* (2021.01)

(52) U.S. Cl.
CPC ..... *G06F 18/2411* (2023.01); *H04M 1/72415* (2021.01); *G06F 2218/00* (2023.01); *H04M 1/72454* (2021.01)

(58) Field of Classification Search
CPC ............ G06F 18/2411; G06F 2218/00; H04M 1/72415; H04M 1/72454; H04M 1/72448; G05B 2219/2642; G05B 15/02
See application file for complete search history.

(56) References Cited

U.S. PATENT DOCUMENTS

| | | | |
|---|---|---|---|
| 9,774,608 B2 | 9/2017 | Nakano et al. | |
| 2011/0196515 A1* | 8/2011 | Niki | G01D 7/00 700/83 |

(Continued)

FOREIGN PATENT DOCUMENTS

| | | |
|---|---|---|
| CN | 105182786 | 12/2015 |
| CN | 106856447 | 6/2017 |

(Continued)

OTHER PUBLICATIONS

European Search Report dated Feb. 28, 2023 issued in counterpart application No. 19902036.3-1205, 7 pages.

(Continued)

*Primary Examiner* — Kabir A Timory
(74) *Attorney, Agent, or Firm* — The Farrell Law Firm, P.C.

(57) ABSTRACT

Embodiments of the present disclosure provides a device control method, an apparatus, an electronic device, and a computer readable storage medium, the method including: acquiring a device control instruction input by a user, acquiring at least one of user information, environment information, and device information, and controlling at least one target device to perform a corresponding operation based on the acquired information and the device control instruction. The embodiments of the present disclosure implement the safe and convenient control of a smart device to perform corresponding operations.

16 Claims, 20 Drawing Sheets

(56) References Cited

U.S. PATENT DOCUMENTS

| | | | |
|---|---|---|---|
| 2014/0358829 A1 | 12/2014 | Hurwitz | |
| 2016/0378080 A1 | 12/2016 | Uppala et al. | |
| 2017/0346649 A1* | 11/2017 | Zhang | H04L 12/2825 |
| 2018/0024520 A1 | 1/2018 | Sinha et al. | |
| 2018/0299840 A1 | 10/2018 | Sinha et al. | |
| 2018/0316664 A1* | 11/2018 | Liu | H04L 9/3247 |
| 2018/0358016 A1* | 12/2018 | Bai | G06N 5/04 |

FOREIGN PATENT DOCUMENTS

| | | |
|---|---|---|
| CN | 107065583 | 8/2017 |
| CN | 107655154 | 2/2018 |
| CN | 108227565 | 6/2018 |
| EP | 2 738 478 | 6/2014 |
| JP | 2010-070171 | 4/2010 |
| KR | 10-2015-0144360 | 12/2015 |
| KR | 10-2017-0129551 | 11/2017 |

OTHER PUBLICATIONS

European Search Report dated Dec. 23, 2021 Issued in counterpart application No. 19902036.3-1205, 7 pages.
PCT/ISA/210 Search Report issued on PCT/KR2019/018392, Apr. 21, 2020, pp. 4.
PCT/ISA/237 Written Opinion issued on PCT/KR2019/018392, Apr. 21, 2020, pp. 7.
Chinese Office Action dated Aug. 7, 2023 issued in counterpart application No. 201910267629.5, 17 pages.
Chinese Office Action dated Mar. 6, 2024 issued in counterpart application No. 201910267629.5, 21 pages.
Chinese Office Action dated May 15, 2024 issued in counterpart application No. 201910267629.5, 35 pages.
CN Decision of Rejection dated Jul. 26, 2024 issued in counterpart application No. 201910267629.5, 28 pages.

* cited by examiner

[Fig. 1]
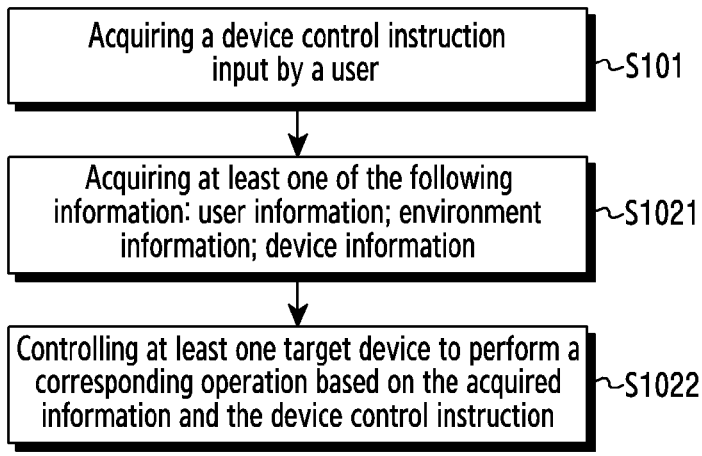
[Fig. 2A]
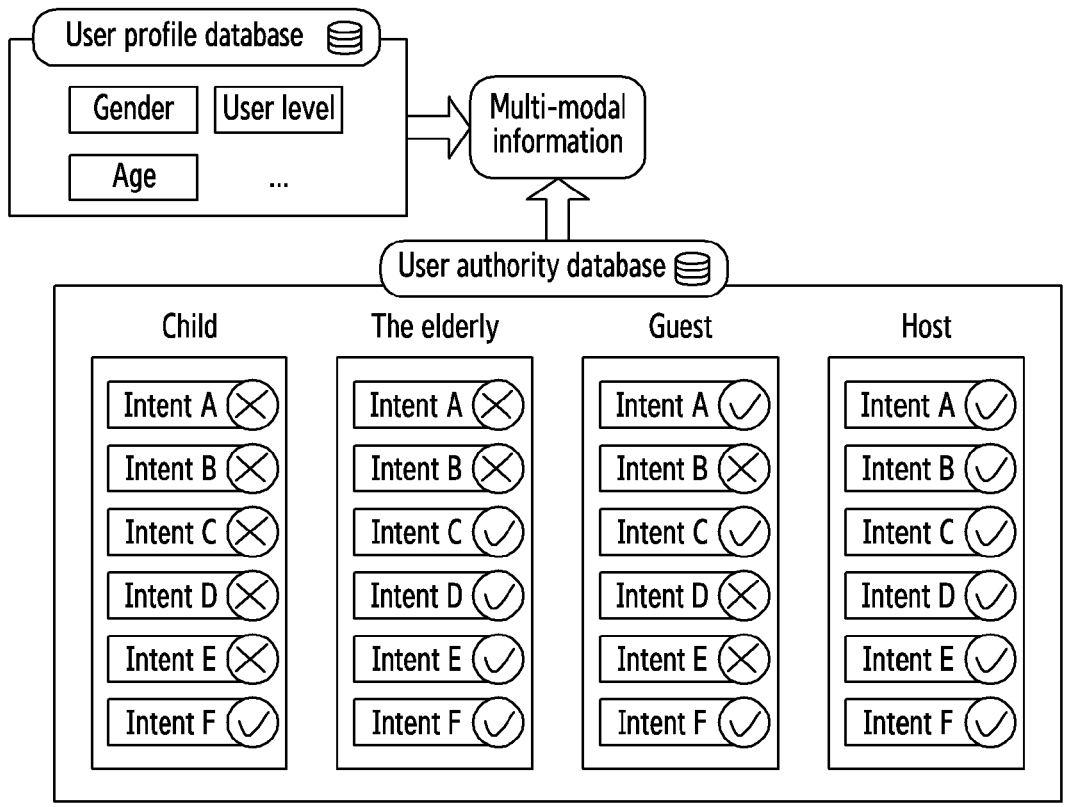

[Fig. 4]
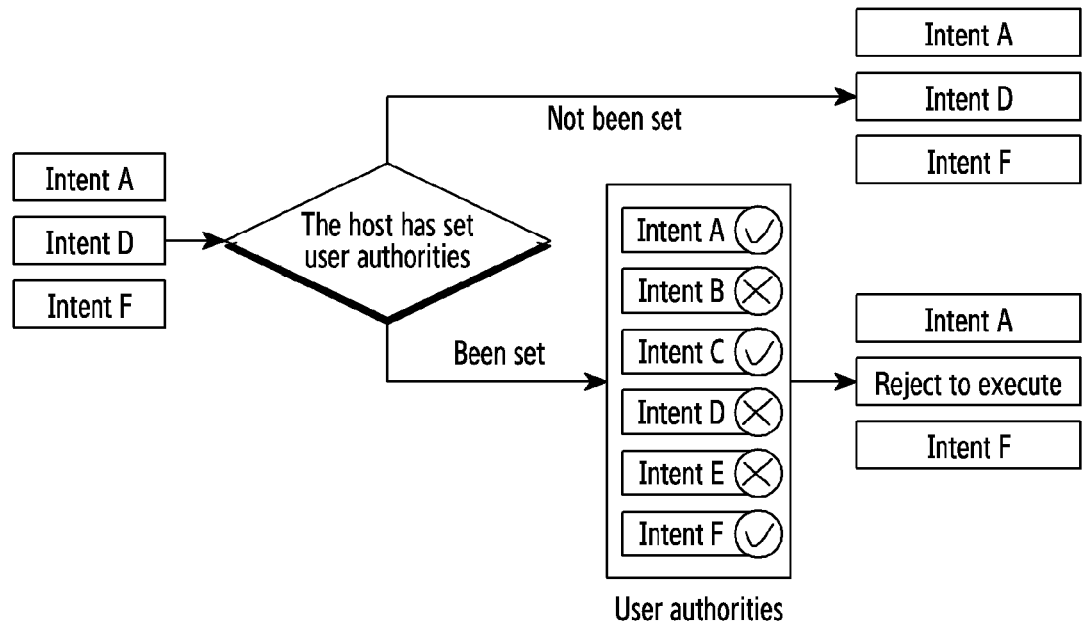
[Fig. 5]
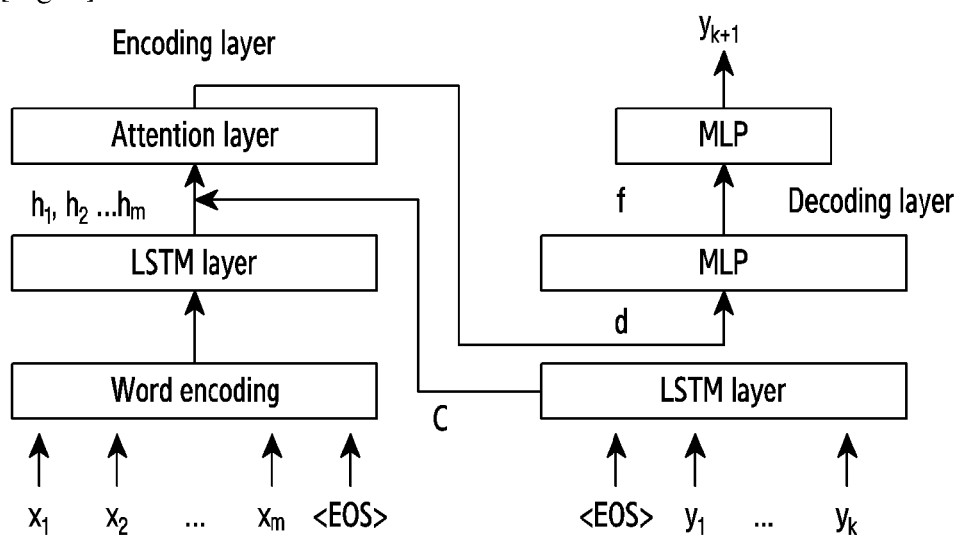

[Fig. 17]
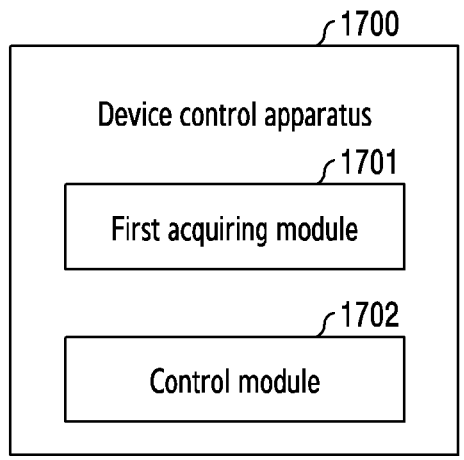
[Fig. 18]
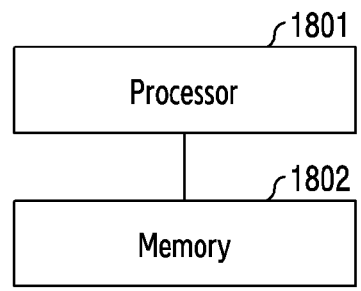
[Fig. 19]
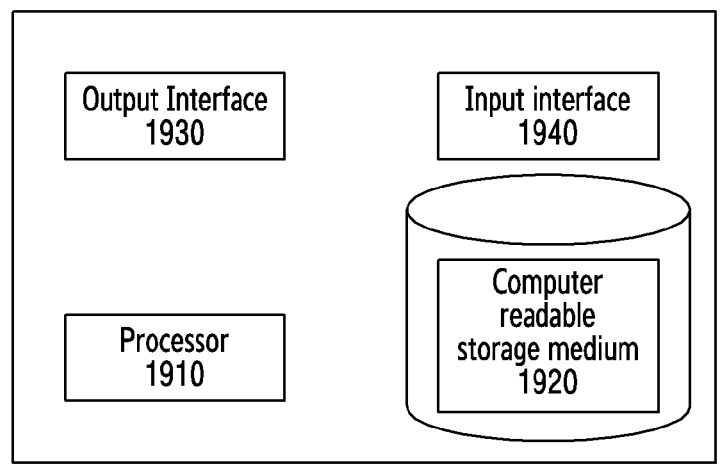

[Fig. 20B]
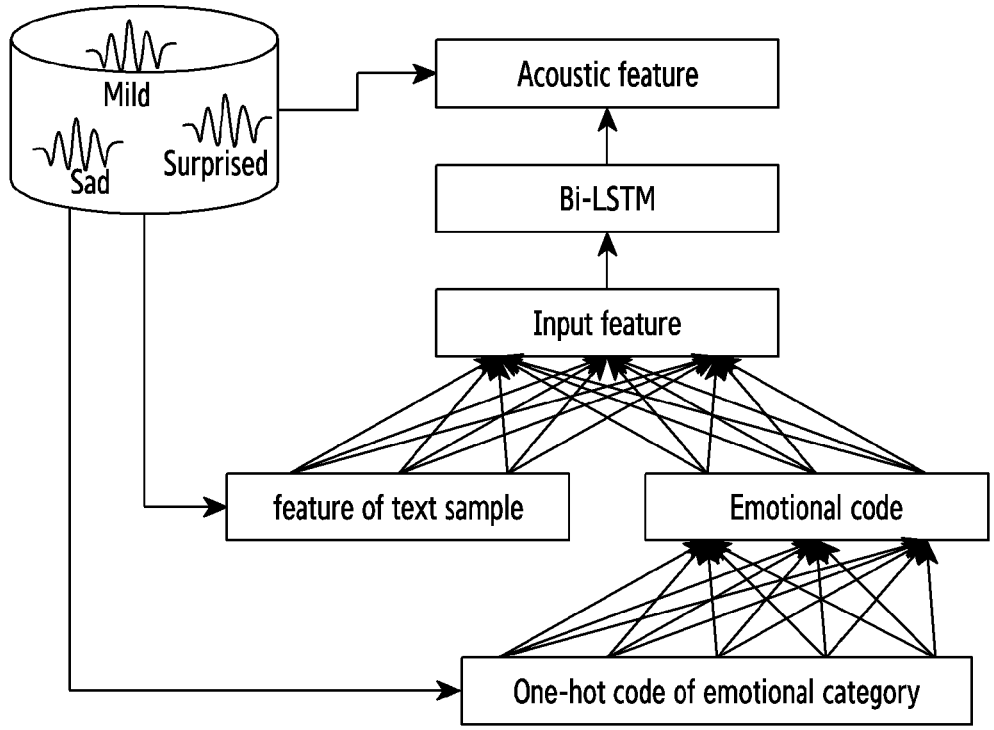
[Fig. 20C]
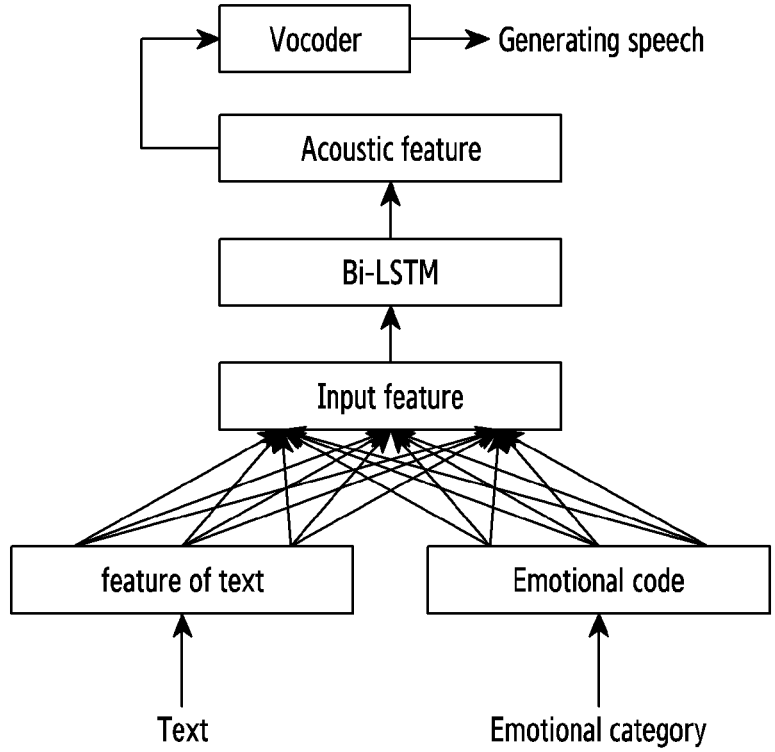

METHOD AND APPARATUS FOR CONTROLLING SMART DEVICE TO PERFORM CORRESPONDING OPERATIONS

PRIORITY

This application is a National Phase Entry of International Application No. PCT/KR2019/018392, which was filed on Dec. 24, 2019, and claims priority to Chinese Patent Application Nos. 201811585137.2 and 201910267629.5, which were filed on Dec. 24, 2018 and Apr. 3, 2019, respectively, the entire content of each of which is incorporated herein by reference.

TECHNICAL FIELD

The present disclosure relates to the field of artificial intelligence technology, and in particular, to a device control method, an apparatus, an electronic device, and a computer readable storage medium.

BACKGROUND ART

With the development of information technologies, various devices for example, air conditioners, washing machines, refrigerators, etc., enter people's daily lives, and users may control these devices to perform corresponding operations by manually adjusting buttons on devices or buttons on remote control devices.

With the further development of artificial intelligence technology, smart devices, for example, smart home devices such as smart speakers, smart air conditioners, smart TVs, smart ovens, etc., gradually enter people's daily life, and users may control smart home devices to perform corresponding operations without manually adjusting buttons on devices or buttons on remote control devices, for example, users may control smart home devices to perform corresponding operations through applications installed on terminal devices such as mobile phones, and particularly for instance, users may control air conditioners to be turned on through smart terminal devices such as mobile phones.

However, in current manners for controlling device, the controlling process is generally only based on control instructions input by users, and other factors that may affect operations of devices are not considered, which may result in low security and flexibility of device controlling process. Therefore, how to control smart devices to perform corresponding operations more safely and flexibly becomes a key issue.

DISCLOSURE OF INVENTION

Technical Problem

The present disclosure provides a device control method, an apparatus, an electronic device, and a computer readable storage medium, which may solve the problem of how to control the smart device to perform corresponding operations more safely and flexibly.

Solution to Problem

In a first aspect, there is provided a device control method, the method comprising:
 acquiring a device control instruction input by a user;
 acquiring at least one of the following information: user information, environment information, and device information;
 controlling at least one target device to perform a corresponding operation based on the acquired information and the device control instruction.

In a second aspect, there is provided a device control apparatus, the apparatus comprising:
 a first acquiring module, configured to acquire a device control instruction input by a user and at least one of the following information: user information; environment information; device information;
 a control module, configured to control the at least one target device to perform a corresponding operation based on the information acquired by the first acquiring module and the device control instruction.

In a third aspect, there is provided an electronic device, the electronic device comprising:
 one or more processors;
 a memory;
 one or more applications, wherein one or more applications are stored in a memory and configured to be executed by one or more processors, and the one or more applications are configured to execute the device control method shown by the first aspect.

In a fourth aspect, there is provided a computer readable storage medium, wherein the storage medium stores at least one computer instruction, at least one program, a code set, or an instruction set that, which, when loaded and executed by the processor to implement the device control method according to the first aspect.

Advantageous Effects of Invention

The technical solution provided by the present disclosure is advantageous in the following:

The present disclosure provides a device control method, an apparatus, an electronic device, and a computer readable storage medium, which may control at least one target device to perform a corresponding operation, by acquiring at least one of user information, environment information, and device information and the device control instruction input by the user, based on the acquired information and the device control instruction. As can be seen from the above, compared with the methods for controlling device based solely on the control instruction input by a user in the prior art, the present disclosure considers at least one factor, which may affect operations of the device, of the user information, the device information, and the environment information, in addition to considering the control instruction input by the user when controlling the device, such that the device may operate more safely and flexibly. For example, by acquiring a device control instruction in formats of voice, text, button, gesture, and the like input by the user, as well as considering at least one of the user information, the device information, and the environment information, an operation of the air conditioner is directly controlled to turn on, off, or adjust the temperature, such that it is possible to control the smart device to perform corresponding operations safely and conveniently.

BRIEF DESCRIPTION OF DRAWINGS

In order to more clearly illustrate technical solutions of embodiments of the present disclosure, the drawings used in the description of the embodiments of the present disclosure will be briefly described below.

FIG. 1 shows a schematic flowchart of a device control method provided by an embodiment of the present disclosure;

FIG. 2A shows a schematic diagram of the configuration of multi-modal information provided by an embodiment of the present disclosure;

FIG. 4 shows a schematic diagram of determining an intent in a device control instruction as an allowable intent provided by an embodiment of the present disclosure;

FIG. 5 shows a schematic diagram of slot tag processing by a slot tagger according to the Embodiment 1 of the present disclosure;

FIG. 17 shows a schematic structural diagram of a device control apparatus in an embodiment of the present disclosure;

FIG. 18 shows a schematic structural diagram of an electronic device in an embodiment of the present disclosure;

FIG. 19 shows a schematic structural diagram of a computer system in an embodiment of the present disclosure;

FIG. 20B shows a schematic flowchart of training a neural network of an Emotional TTS in an embodiment of the present disclosure; and FIG. 20C shows a schematic diagram of an online process of a neural network of an Emotional TTS in an embodiment of the present disclosure.

BEST MODE FOR CARRYING OUT THE INVENTION

Figure 2B:
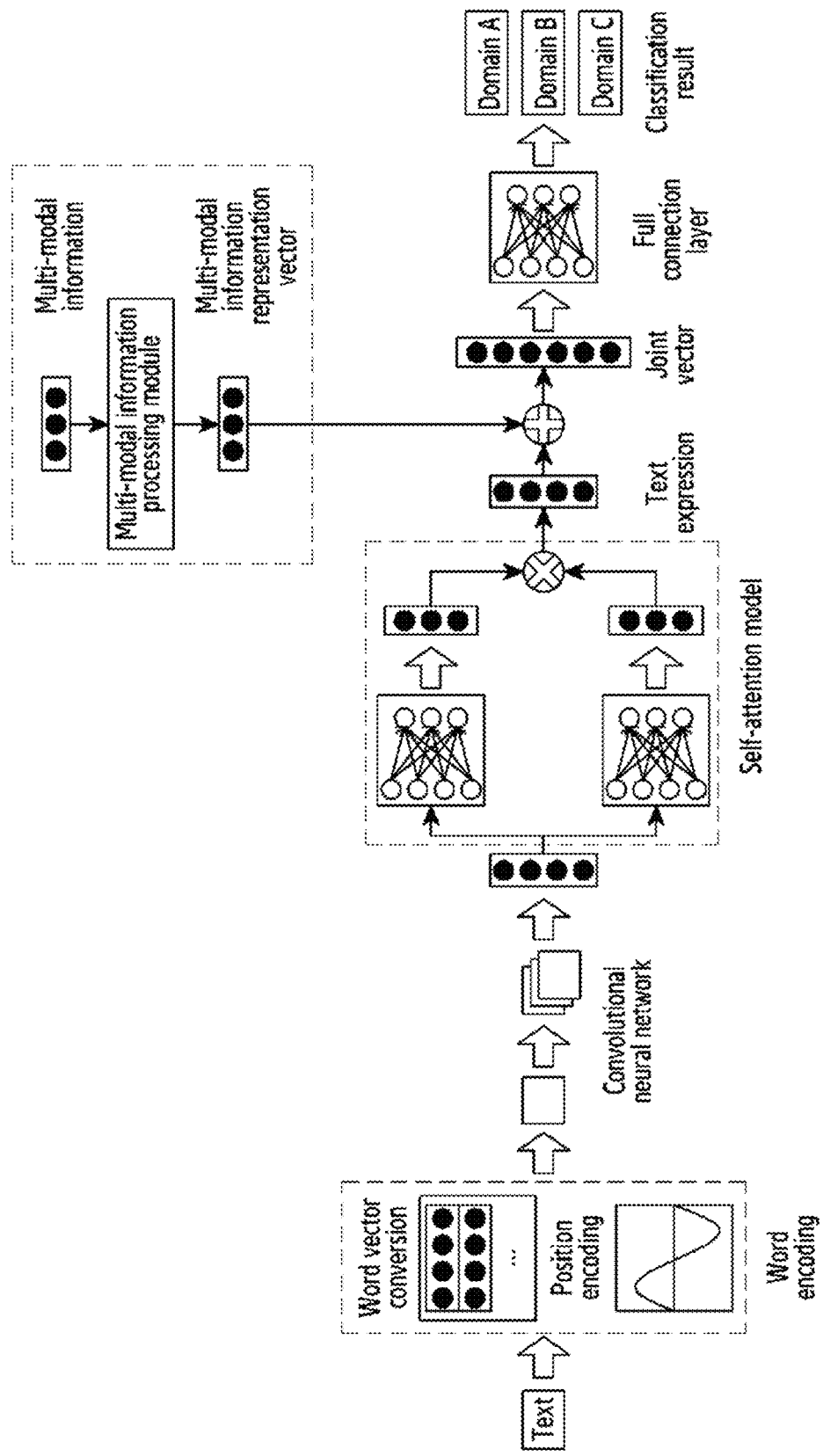
FIG. 2B shows a schematic diagram of obtaining domain classification results by using a domain classifier in an embodiment of the present disclosure.

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skilled practitioners in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

With the development of science and technology, smart homes have gradually entered people's lives. That using voice-controlled smart speakers, smart TVs and other devices provides a hardware foundation for smart homes. In future, after the intellectualization of TVs, refrigerators, ovens, washing machines and other equipment, it will be realized that various home appliances to perform corresponding operations by voice control.

However, when a user controls a smart device (including terminal device such as a smart home device, a mobile phone, a tablet PAD, etc.) by an instruction (for example, a voice, a text, a button, a gesture, etc.) to perform a corresponding operation, various problems may occur:

Problem 1

There are often children and the elderly in family, and devices, for example ovens, need to be prohibited from being used by children; some functions of computers and TVs should also be prohibited from being used by children; in addition, existing smart home devices are not friendly to the elderly, some operations are more complicated, and the elderly may misuse and may even cause danger. In addition, there is no suitable feedback on operating parameters of smart home appliances in the voice control system, for example, if an oven temperature is excessive, a cooking task will still be performed which may result dangers.

The existing smart device control system does not perform differentiated controls for users, and performs the same operation for all user requests. For example, the abovementioned user groups such as the elderly and children are unable to be given corresponding protections or suggestions, which may bring danger; for another, if the smart devices are not using corresponding protective measures according to device conditions or environment conditions, it may also bring danger.

For example, a smart device in the prior art performs corresponding operations on device control instructions (such as voice instructions) for children, and does not consider whether the children are suitable for operating a certain device or performing a certain function, even if a device, for example an oven, more dangerous for children may also allow children to operate, which brings a greater risk to children; for another example, instructions for the elderly do not provide protective measures, making the elderly operate devices very cumbersome, and also resulting potential danger due to operational errors. In other words, the smart device control system in the prior art does not consider the relevant information of the user when the user controls a device, thereby resulting in low security of the device control process.

For another example, when a user operates a smart device such as an oven, if the oven currently has a high temperature and has been working for a long time, it is not suitable for continuing to heat food for a long time and in a high temperature, which is easy to damage the device or bring danger to the user. However, the prior art does not give corresponding protective measures according to the relevant information of the device, thereby resulting in low safety of the device control process.

For another example, when a user operates a smart device such as an air conditioner, if the current ambient temperature is low, it is not suitable for continuing to cool down, which is easy to bring a health risk to the user; however, the prior art does not provide corresponding protective measures according to relevant information of the device, thereby resulting in lower security of the device control process.

Problem 2

When a user controls a smart device through an instruction (for example, a voice, a text, a button, a gesture, etc.), the operating parameters corresponding to the control instruction may have the following problems:

1) it may bring a danger to the device or the user, for example, the control instruction input by a user is: raise an oven to 240 degrees centigrade, but if the oven is operated for a long time, too high temperature may cause danger to the user or the device; the prior art does not consider the above indicated dangerous situations for the above instruction, and still performs corresponding operations in accordance with the user instruction;

2) a parameter corresponding to the control instruction has already exceeded the executable range of the device, for example, the control instruction input by the user is to adjust an air conditioner temperature to 100 degrees centigrade, but the upper limit temperature of the air conditioner is 32 degrees centigrade, and the corresponding 100 degrees centigrade in the user's instruction has already exceeded the executable range of the air conditioner; for example, the control instruction input by the user for a mobile phone is to set an alarm clock on February 30 to 8:00 AM, but February 30 is a date that does not exist, exceeding the alarm setting range; after receiving the above instruction, it does not perform any corresponding operations in the prior art, which makes worse user experience;

3) an operation corresponding to the instruction may not be applicable to the user issuing the instruction, for example, the control instruction input by a child is to turn on Channel 10 of a TV, but Channel 10 of the TV is a channel that is not suitable for children to watch, however in the prior art, when receiving the abovementioned control instruction input by the child, the corresponding instruction is still executed based on the control instruction input by the child, which does not consider the abovementioned unsuitable situation and still performs a corresponding operation according to the user instruction;

4) when the control instruction input by the user is unclear, for example, the instruction input by the user is to adjust the temperature of the air conditioner to a suitable temperature, which is unclear for the air conditioner, and the air conditioner cannot determine the final adjusted temperature, such that it does not perform any operations in the prior art after receiving the above instruction, thereby resulting in wore user experience.

It may be seen from the above in the prior art, after the device receives the control instruction transmitted by the user through voice or the like, the device does not adjust the instruction, and even if there is a danger or not applicable, the corresponding operation is still performed, or the instruction is unclear or out of the execution range, the device may not perform any operation, resulting in low security when the user controls these devices through control instructions, or there are inconvenient problems, thereby resulting in poor user experience.

Certainly, for problem 1, there are some solutions in the prior art to prevent children from operating on certain devices, such as locking devices through button-type, password-type, and fingerprint-type to prevent children from using the devices. The button-type refers to often unlocking based on a specific button or button combination, such as an induction cooker or a washing machine, the password-type refers to unlocking based on a specific password, such as a TV and a computer, and the fingerprint-type refers to unlocking based on fingerprint, such as a mobile phone; however, in a smart home scenario, for all kinds of home appliances controlled by voice, all of the above protection technologies need to a person, who want to unlock the device, to go beside the locked electrical appliance to perform unlocking, which will increase a lot of inconvenience and may cause inconvenience to use the device. Meanwhile, the button-based unlocking method is relatively simple, and if a child learns to use the fix button or the button combination, the appliance may be used, which is easy to cause danger; therefore, the conventional protection technologies are not suitable for the full voice control scenario in smart home.

Therefore, in response to the above problems, the embodiment of the present disclosure provides a method for controlling a smart device that may be applied to a control system of smart home, which first acquires an instruction (including a voice instruction) input by a user, also acquires image information of the user, and acquires user information of the user according to the image information of the user and/or voice information through the database comparison, which including a user profile (such as age, gender, etc.), a user authority (such as the user's authority for controlling device), and the like; in addition, it may also acquire device information (such as device working state information) or environment information (device working environment information), etc., perform corresponding semantic understanding operations according to the user information, and/or the device information, and/or the environment information, and then perform corresponding operations according to semantic understanding results, such that corresponding operations may be performed according to relevant information of the user, the device, and the environment. Specifically:

Different operations are performed on different users to implement special protection for children, the elderly and other groups. When the user does not have the control authority for the device, the operation result of rejecting to execute the device control instruction may be output, or when the user does not have the control authority for the target function corresponding to the device control instruction, the operation result of rejecting to execute the device control instruction may be output. For example, when the user is a child, the device may be controlled correspondingly according to the authority corresponding to the child, such as not allowing the child to operate a certain device (such as an oven), or restricting a certain function of the device operated by the child, such as not allowing to delete a saved TV channel.

A corresponding operation is performed according to the working state of the device to implement safe operation of the device and protect the device and the user. When the device does not satisfy an execution condition corresponding to the device control instruction, the operation result of rejecting to execution the device control instruction may be output. For example, when the device is an oven, if the oven has been working for a long time, the excessive temperature may cause danger to the user or the device, and at this time, the operation result of rejecting execution may be output for the instruction of rising temperature of the user, to protect to the user and the device.

A corresponding operation is performed according to the working environment of the device to implement safe operation of the device and protect the device and user. When the working environment of the device does not satisfy an execution condition corresponding to the device control instruction, the operation result of rejecting to execute the device control instruction may be output. For example, when the device is an air conditioner, if the current ambient temperature is very low, it is not suitable for continuing to cool down and easy to bring a health hazard to the user, and meanwhile an operation result of rejecting to perform may be output to the user for the temperature cooling operation instruction of the air conditioner, so as to protect to the user.

Further, the embodiment of the present disclosure further provides a method for rewriting parameter, which solves the technical problem 2, and when a control instruction (including the voice instruction) form the user is dangerous or inapplicable, or if the instruction is unclear or exceeds the execution range, it may automatically change an operation parameter corresponding to the control instruction to improve convenience and security for the user to use the device.

Specifically, in order to solve the above problems, the embodiment of the present disclosure provide a device control method, as shown in FIG. 1, the method including:

Step S101: acquiring a device control instruction input by a user.

For the embodiment of the present disclosure, the user may input the device control instruction in a text manner, or input the device control instruction in a voice manner, or input the device control instruction by using other manners for example as a button or a gesture. It is not limited in the embodiments of the present disclosure.

Step S102 (not shown in the figure): controlling at least one target device to perform a corresponding operation based on the acquired device control instruction.

Specifically, the controlling the at least one target device to perform a corresponding operation in Step S102, includes Step S1021 and Step S1022, wherein, Step S1021: acquiring at least one of the following information: user information, environment information, and device information.

Step S1022: controlling at least one target device to perform a corresponding operation based on the acquired information and the device control instruction.

In a possible implementation of the embodiment of the present disclosure, the user information may include user information of the user inputting the device control instruction; the device information may include device information of the target device corresponding to the device control instruction of the user; and the environment information may include environment information corresponding to the target device.

In a possible implementation of the embodiment of the present disclosure, the user information includes user profile information and/or device control authority information of the user; and/or the device information includes working state information of the device; and/or the environment information includes working environment information of the device.

For the embodiment of the present disclosure, the user profile information includes user information for example user identity information, age, gender, user preference and the like, and may also include historical information that the user controls device (for example, when the user previously controls the air conditioner, the air conditioning temperature is generally set to 28 degrees centigrade, or when controlling the TV the user generally sets the TV channel to Channel 1 and Channel 5); the device control authority information of the user includes: the user's control authority for a device and/or the user's control authority for a target function. Wherein, in the embodiment of the present disclosure, the target device refers to a device that the user wants to control, and the target function refers to a function that the user wants to control for the target device, for example, if the user wants to rise the temperature of the air conditioner, then the air conditioner is the target device, and that rising the temperature of the air conditioner is the target function.

For the embodiment of the present disclosure, the working state information of the device includes at least one of the following: current working state information of the device (for example, temperature, humidity, channel, power, storage condition, duration of continuous operation, etc.), target working state (for example, the optimal working state of the device, etc.), the executable functions of the device, the executable parameters (for example the adjustable temperature range of the air conditioner is 16 to 32 degrees centigrade), and the like.

For the embodiment of the present disclosure, the working environment information of the device includes: current working environment information of the device and/or set target working environment information (for example, optimal working environment information, etc.); wherein the working environment information contains temperature, humidity, pressure, etc.

In another possible implementation of the embodiment of the present disclosure, Step S1022 may specifically include Step S10221 (not shown in the figure), wherein, Step S10221: outputting an operation result of rejecting to execute the device control instruction based on the acquired information and the device control instruction.

Specifically, in Step S10221, the outputting an operation result of rejecting to execute the device control instruction, includes: outputting the operation result of rejecting to execute the device control instruction, when determining that at least one of the following is satisfied according to the acquired information:

the user possessing no control authority for the at least one target device; the user possessing no control authority for a target function corresponding to the device control instruction; the at least one target device not satisfying an execution condition corresponding to the device control instruction; and a working environment of the at least one target device not satisfying an execution condition corresponding to the device control instruction.

In another possible implementation of the embodiment of the present disclosure, the controlling at least one target device to perform a corresponding operation, includes: determining at least one target device corresponding to the device control instruction and/or a target function corresponding to the device control instruction, based on the acquired information and the device control instruction; controlling at least one target device to perform the corresponding operation based on the at least one target device and/or the target function.

In another possible implementation of the embodiment of the present disclosure, the determining at least one target device corresponding to the device control instruction, includes: performing domain classification processing based on the acquired information and the device control instruction to obtain an execution probability of each device; and outputting the operation result of rejecting to execute the device control instruction if the execution probability of each device is less than a first preset threshold, or otherwise, determining at least one target device corresponding to the device controlling device based on the execution probability of each device.

For the embodiment of the present disclosure, domain classification processing is performed based on the acquired information and the device control instruction to obtain an execution probability of each device; and the operation result of rejecting to execute the device control instruction is output if the execution probability of each device is less than a first preset threshold which characterizes that the user does not have control authority for the at least one target device, or otherwise, the at least one target device corresponding to the device controlling device is determined based on the execution probability of each device.

In another possible implementation of the embodiment of the present disclosure, the determining the target function corresponding to the device control instruction, includes: performing intent classification processing based on the acquired information and the device control instruction to determine an execution probability of each control function; outputting the operation result of rejecting to execute the device control instruction if the execution probability of each control function is less than a second preset threshold, or otherwise, determining the target function corresponding to the device control instruction based on the execution probability of each control function.

For the embodiment of the present disclosure, the operation result of rejecting to execute the device control instruction is output if the execution probability of each control function is less than a second preset threshold, which characterizes that the user possesses no control authority for the target function corresponding to the device control instruction.

For the embodiment of the present disclosure, when the device control instruction input by the user is obtained, during performing a corresponding operation, by combining at least one of the user information, the environment information, and the device information, factors affecting device operation and/or user security may be considered, thereby avoiding potential dangers and thus more intelligently controlling the device control instruction to improve the user experience; for example, when the device control instruction input by the user is input by a child and the target device to be controlled is an oven, it may be input that the operation result of rejecting to execute the device control instruction in conjunction with the user information and the like, to avoid the danger of operating the oven for the child.

In another possible implementation of the embodiment of the present disclosure, Step S1022 may specifically include: Step S10222 (not shown in the figure), wherein, Step S10222: controlling at least one target device to perform a corresponding operation based on the acquired information.

Wherein the target parameter information is the parameter information after the parameter information in the device control instruction is changed.

Specifically, in Step S10222, the controlling the at least one target device to perform a corresponding operation according to target parameter information, includes: controlling the at least one target device to perform a corresponding operation according to the target parameter information when satisfying at least one of the following:

the device control instruction not containing a parameter value;

the parameter value contained in the device control instruction not belonging to the parameter value in a parameter value range determined by the acquired information.

For example, the device control instruction inputted by the user is "adjust the air conditioner to a suitable temperature." That is, if the device control instruction does not contain the parameter value, then the parameter information in the device control instruction may be changed according to at least one of the user information, the device information, and the environment information to obtain the target parameter information, and the air conditioner is controlled according to the target parameter information to perform the corresponding operation; for example, if the temperature of the current environment is 32 degrees centigrade in summer, the user generally sets the temperature to 25 degrees centigrade when controlling the air conditioner temperature in summer, and therefore, the parameter value of the target parameter information may be set to 25 degrees centigrade which will lead the air conditioner operating at 25 degrees centigrade.

For another example, if the device control instruction input by the user is "adjust the temperature of the air conditioner to 100 degrees centigrade", and the parameter value (100 degrees centigrade) contained in the device control instruction does not belong to the parameter value in the parameter value range determined by the acquired information (18 degrees centigrade to 32 degrees centigrade), the parameter information in the device control instruction is changed, to obtain the target parameter information, and the air conditioner is controlled to perform a corresponding operation according to the target parameter information, such as setting the parameter value of the target parameter information to 25 degrees centigrade according to the user information and the environment information, which will lead the air conditioner operating at 25 degrees centigrade.

In another possible implementation of the embodiment of the present disclosure, the controlling the at least one target device to perform a corresponding operation according to target parameter information, includes: performing slot tag processing on the device control instruction to obtain the parameter information in the device control instruction; determining whether to change the parameter information in the device control instruction based on the parameter information in the device control instruction and the acquired information; if changed, determining the changed target parameter information based on the parameter information in the device control instruction and the acquired information.

In another possible implementation of the embodiment of the present disclosure, the determining whether to change the parameter information in the device control instruction based on the parameter information in the device control instruction and the acquired information, includes: obtaining, by logistic regression processing, the logistic regression result based on the parameter information in the device control instruction and the acquired information; determining whether to change the parameter information in the device control instruction based on the logistic regression result; and/or, the determining the changed target parameter information based on the parameter information in the device control instruction and the acquired information, includes: obtaining a linear regression result based on the parameter information in the device control instruction and the acquired information by linear regression processing; determining the changed parameter information based on the linear regression result.

In another possible implementation of the embodiment of the present disclosure, the method may further include Step Sa (not shown in the figure) and Step Sb (not shown in the figure), wherein, Step Sa: acquiring multiple training data;

Step Sb: training a processing model for changing the parameter information in the device control instruction based on the acquired training data and through a target loss function.

Wherein, any of the training data comprising the following information:

device control information, parameter information in the device control information, information indicating whether the parameter in the device control instruction has been changed, changed parameter information, user information, environment information, and device information.

In another possible implementation of the embodiment of the present disclosure, before Step Sb, the method may further include Step Sc (not shown in the figure), wherein Step Sc: determining the target loss function.

Specifically, Step Sc may specifically include Step Sc1 (not shown in the figure), Step Sc2 (not shown in the figure), Step Sc3 (not shown in the figure), and Step Sc4 (not shown in the figure), wherein, Step Sc1: determining a first loss function based on the parameter information in the device control instruction in each training data and the parameter information in the device control instruction predicted by the model;

Step Sc2: determining a second loss function based on the information indicating whether the parameter in the device instruction in each training data has been changed and the information indicating whether it will be changed predicted by the model;

Step Sc3: determining a third loss function based on the changed parameter information in each training data and the changed parameter information predicted by the model;

Step Sc4: determining the target loss function based on the first loss function, the second loss function, and the third loss function.

For the embodiment of the present disclosure, when controlling the target device to perform the corresponding operation based on the device control information input by the user, during determining the target parameter information corresponding to the corresponding operation performed by the target device, it may be determined whether to change the parameter information in the device control instruction and the changed parameter information by combining at least one of the user information, the device information, and the environment information, so as to control the target device to perform a corresponding operation based on the changed parameter information, thereby improving the intelligence of performing the corresponding operation based on the control instruction and improving the user experience.

For example, when the device control instruction is "turn the oven temperature up to 240 degrees centigrade", based on the device information, if the current oven temperature is higher and the running time is longer, the oven temperature may be adjusted to a lower temperature, thereby avoiding device damage and ensure the user's personal safety during the operation; for another example, when the user device instruction is "adjust the air conditioning temperature to 100 degrees centigrade', based on the device information, the air conditioning temperature cannot be adjusted to 100 degrees centigrade, and the target parameter information may be adjusted to 32 degrees centigrade based on at least one of the user information, the device information and the environment information and the like to avoid the situation that the device is not executed due to parameter problems in the device control instruction, thereby improving user experience; for another example, the user device instruction input by the child is "open Channel 10 on TV', combined with the user information, it is known that the child is not allowed to watch Channel 10 on TV, and it may adjust Channel 10 for another channel which is suitable for the child, thereby improving the intelligence of controlling the device to perform the corresponding operation, and thus improving user experience; for another example, the device control instruction input by the user is "adjust the air conditioner to the appropriate temperature', it may be known that the device control instruction does not contain the parameter value, and then it may adjust the suitable temperature to 25 degrees centigrade in combination with at least one of the user information, the environment information and the device information to avoid the situation that the device does not execute when it receives a unclear instruction, thereby improving user experience.

In another possible implementation of the embodiment of the present disclosure, after Step S1021, Step Sd (not shown in the figure) and Step Se (not shown in the figure) may be included, wherein, Step Sd: converting discrete information in the acquired information into a continuous dense vector;

Step Se: determining an information representation vector corresponding to the acquired information according to the converted continuous dense vector and the continuous information in the acquired information.

Specifically, Step S1022 may specifically include: controlling at least one target device to perform the operation based on the information representation vector corresponding to the acquired information and the device control instruction.

The embodiment of the present disclosure provides a device control method, which may control at least one target device to perform a corresponding operation, by acquiring at least one of user information, environment information, and device information and the device control instruction input by the user, based on the acquired information and the device control instruction; as can be seen from the above, compared with the methods for controlling device based solely on the control instruction input by a user in the prior art, the present disclosure considers at least one factor, which may affect operations of the device, of the user information, the device information, and the environment information, in addition to considering the control instruction input by the user when controlling the device, such that the device may operate more safely and flexibly. For example, by acquiring a device control instruction in forms of voice, text, button, gesture, and the like input by the user, as well as considering at least one of the user information, the device information, and the environment information, an operation of the air conditioner is directly controlled to turn on, off, or adjust the temperature, such that it is possible to control the smart device to perform corresponding operations safely and conveniently.

The following describes a device control method in conjunction with specific embodiments, which may include three embodiments and are respectively Embodiment 1, Embodiment 2, and Embodiment 3. Embodiment 1 is mainly used to solve problem 1 in the prior art, which during performing corresponding operations based on the device control instruction input by a user, the user inputting the device control instruction is not recognized, causing some groups (such as children or elderly people) to dangerously operate certain devices (such as the oven), or unable to be restricted to operate a certain device or a certain function of a certain device, for example, the child cannot be restricted to turn on the smart TV or the child cannot adjust the channel; Embodiment 2 is mainly used to solve technical problems 2 existing in the prior art, including: the parameter value in the device control instruction input by the user will cause damage to the user or the device; the parameter value in the device control instruction input by the user exceeds the range executable by the device; the parameter value in the device control instruction input by the user is a parameter value of the user's limited operation; the parameter value in the device control instruction input by the user is unclear, or the parameter value is not contained therein at all; Embodiment 3 is a combination of Embodiments 1 and 2, and may be used to solve the technical problems existing in the problems 1 and 2 of the prior art, which are as follows:

Embodiment 1

The at least one target device corresponding to the device control instruction and/or the target function corresponding to the device control instruction may be determined by the acquired user information and/or environment information and/or device information as well as the device control instruction input by the user, and a corresponding operation is performed based on the determined at least one target device and/or the target function.

This embodiment mainly considers the user information of the user input by the device control instruction to determine whether the user has the authority to operate the target device and/or the target function involved in the device control instruction. In addition to the user information considered in Embodiment 1, it is also possible to determine whether the user has authority to operate the target device and/or the target function according to the device information and/or the environment information. In the embodiment of the present disclosure, the device control instruction input by the user may be input by means of a voice, a text, a button, a gesture, and the like. In this embodiment, the device control instruction input by the user is described in a voice form, as follows:

Step S201 (not shown in the figure): acquiring a device control instruction input by the user.

For the embodiment of the present disclosure, the device control instruction input by the user may be input by the user by means of a voice, a text, a button, a gesture, and the like. It is not limited in the embodiment of the present disclosure. The embodiment of the present disclosure introduces an example in which a user inputs a device control instruction by voice.

Step S202 (not shown in the figure): acquiring at least one of the following information: user information, environment information, and device information.

For the embodiment of the present disclosure, the user information includes user profile information and/or device control authority information of the user.

For the embodiment of the present disclosure, the device information includes working state information of the device.

For the embodiment of the present disclosure, the environment information includes working environment information of the device.

For the embodiment of the present disclosure, the user profile information may include user identity information and/or gender and/or age and/or user preference information and the like.

For the embodiment of the present disclosure, the device control authority information of the user includes a user's control authority for the device and/or a user's control authority for the target function.

For the embodiment of the present disclosure, the working state information of the device includes at least one of the following: current working state information of the device (such as temperature, humidity, channel, power, storage condition, duration of continuous operation, etc.), and executable functions of the device, executable parameters, etc.

For the embodiment of the present disclosure, the working environment information of the device includes a current working environment of the device and/or a set target working environment (such as an optimal working environment, etc.).

Wherein, the working environment includes temperature, humidity, pressure and the like.

For the embodiment of the present disclosure, Step S201 may be performed before Step S202, or may be performed after Step S202, and may also be performed simultaneously with Step S202. It is not limited in the embodiment of the present disclosure.

For the embodiment of the present disclosure, the user profile database and the user authority database may be preset, as shown in FIG. 2A, wherein the user profile database stores user profile information, including: gender, age, user level (also referred to as user group), nickname, voice recognition template, and face recognition template and other data, wherein the user group may be divided into four user groups, namely, a host user group, a child user group, an elderly user group, and a guest user group. Wherein, the user profile data of the host user group, the child user group, and the elderly user group may be written at the time of registration, and the user profile data of the guest user group may be written at the time of registration or at the time of use; in the user authority database, the device control authority of each user for using each device is recorded; if the authorities are set separately according to the user groups, the user authority database may record a list of the categories of the device that may be used by the host user group, the child user group, the elderly user group, and the guest user group (i.e., user's control authorities for the device) and functions that each device may use (i.e., user's control authority for the target function), wherein the list may also be referred to as an intent list, containing executable or inexecutable intents for each user or each user group, the intent containing the target device and/or target function that the user wants to control. For example, that controlling an air conditioner belongs to an intent, and that raising the air conditioner temperature also belongs to an intent.

As shown in FIG. 2A, in the authority database, each user or each user group may be separately set with an intent list, for example, for a child user group, the intents A, B, C, D, E may not be allowed, and the intent F is allowed to be performed; for the elderly user group, intents A, B are not allowed to be performed, and intents C, D, E, F are allowed to be performed; for the guest user group, intents B, D, E are not allowed to be performed, intents A, C, F are allowed to be performed; for the host user group, the intents A, B, C, D, E, and F are all allowed to be performed, which the function list has a default setting and may also be set manually, such as manually set by a user in the user group.

For the embodiment of the present disclosure, user information is acquired by voiceprint recognition and/or image recognition. In the embodiment of the present disclosure, after acquiring the device control instruction input by the user by using the voice, the user profile information of the user input by the device control instruction is determined, such as at least one of identity information, gender information, age information, and user group information, based on the voiceprint recognition; if an image collecting apparatus is provided on some devices, based on user's face image information of the user inputting the device control instruction collected by the image collecting apparatus, the user profile information of the user inputting the device control instruction may be determined based on the face image recognition technology, such as at least one of identity information, gender information, age information, and user group information. Specifically, when the corresponding sound signal and the face image signal are collected, the identity authentication may use the face authentication information to compare and authenticate with the user face recognition template of each user in the user profile database to determine the user identity. When only the sound signal, rather than the face image signal, is collected, the identity authentication uses the voiceprint authentication information to compare and authenticate with the user's voiceprint recognition template in the user profile database to determine the user identity (considering that in the scenario of smart home, a camera is often installed on a computer or a TV, when the speaker is in kitchen and bedroom, an image signal may not exist).

When the authentication is passed (i.e., the speaker's feature has a high degree of similarity to a user's voiceprint recognition template (or face recognition template) in the existing user profile database), the user profile of the user in the user database is output, including gender, age, user group, etc.; if the identity authentication fails, it means a new user, then creating and writing new user profile data, writing the acquired gender data, age data, etc., and the user group may be set as a guest, outputting new user profile data, including gender, age, user group, etc., then querying the user authority (also referred to as user device control authority) of the corresponding user group in the authority database according to the user group in the output user profile data and outputting thereof. User authority and user profile information is integrated into multi-modal information, and at least one target device corresponding to the device control instruction and/or target function corresponding to the device control instruction is determined based on the integrated multi-modal information and the device control instructions input by the user, as in Step S203.

For the embodiment of the present disclosure, a Markov random domain, a convolutional neural network, or the like may be used to perform voiceprint recognition on a device control instruction input by voice to determine at least one of identity information, gender information, and age information of the user inputting the device control instruction. Taking the neural network method as an example, after training the voiceprint classification network with a large amount of data, the network is used to extract a feature vector of the voiceprint and save the feature vector as a template; comparing the feature of the voiceprint to be authenticated with the cosine distance of each feature template in the database during authentication, if exceeding the threshold, the authentication is considered to be successful, otherwise it fails; the convolutional neural network may also be used for voice recognition of age information and/or the gender information, which is not described in the embodiment of the present disclosure.

For the embodiment of the present disclosure, after acquiring the device control instruction input by the user by using the voice, the sound noise cancellation processing may also be performed on the device control instruction input by the user. In the embodiment of the present disclosure, the sound noise cancellation technology may include a multi-microphones cooperative noise cancellation technology, and a convolutional neural network noise cancellation technology. This is not described in the embodiment of the present disclosure.

Step S203 (not shown in the figure): determining the at least one target device corresponding to the device control instruction and/or the target function corresponding to the device control instruction based on the acquired information and the device control instruction.

Specifically, the controlling the at least one target device to perform a corresponding operation based on the acquired information and the device control instruction includes: controlling the at least one target device to perform an operation based on the information representation vector corresponding to the acquired information and the device control instruction.

Further, a manner of converting the multi-modal information (the acquired information) into an information representation vector corresponding to the multi-modal information is introduced, wherein specifically, after acquiring at least one of the user information, the environment information, and the device information, this manner further includes converting the discrete information in the acquired information into a continuous dense vector; and the information representation vector (multi-modal information representation vector) corresponding to the acquired information is determined according to the converted continuous dense vector and the continuous information in the acquired information.

For the embodiment of the present disclosure, the discrete information in the acquired information may be converted into a continuous dense vector by a transform matrix. In the embodiment of the present disclosure, a continuous dense vector is obtained by conversion by the transform matrix; the converted continuous dense vector and the information not belonging to the discrete value in the acquired information are connected to obtain a joint vector, and then the joint vector is performed with a preset processing to obtain an information representation vector corresponding to the acquired information.

Figure 3A:
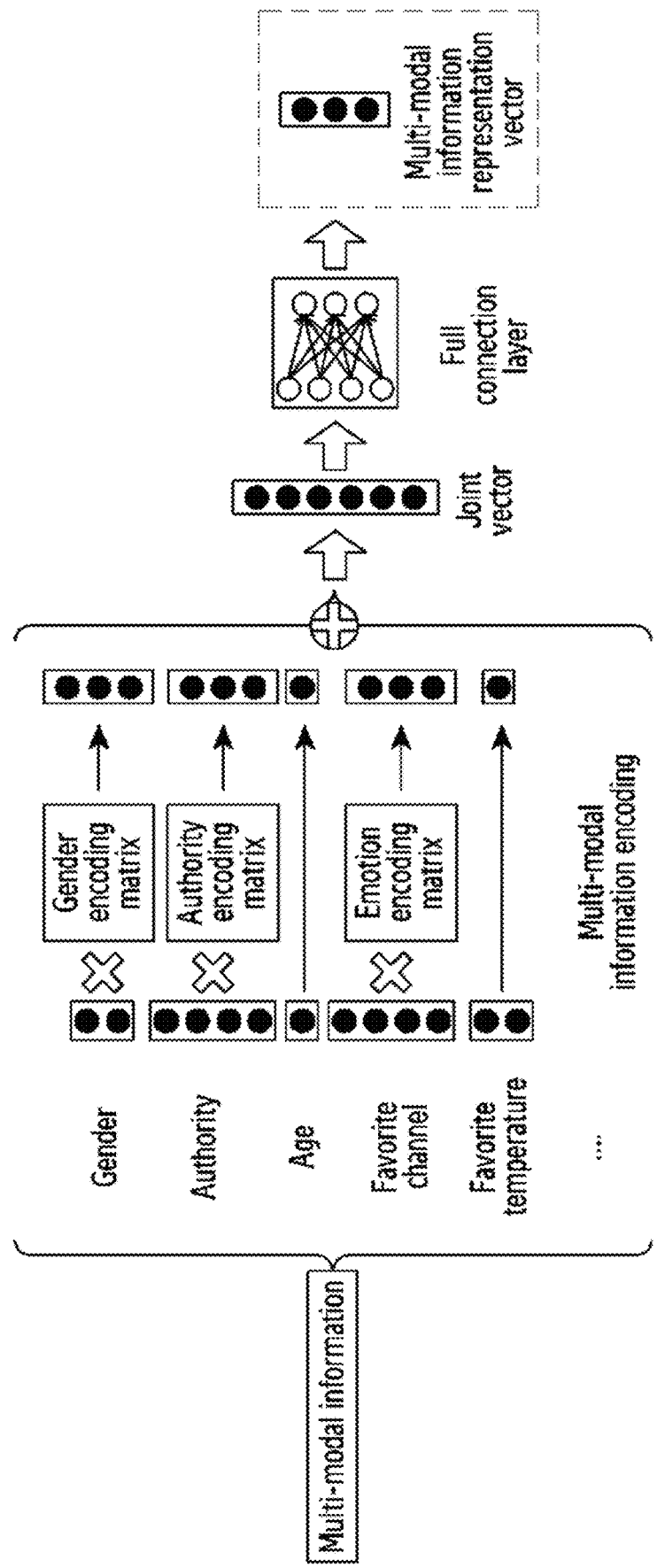
FIG. 3A shows a schematic diagram of obtaining an information representation vector (a multi-modal information representation vector) corresponding to acquired information by the acquired information (multi-modal information) according to Embodiment 1 of the present disclosure.

Specifically, as shown in FIG. 3A, when encoding (multi-modal information encoding) the acquired information (multi-modal information), for example, gender, authority, and favorite channels are, as discrete values, required to be converted into a continuous dense vector by an encoding matrix, meanwhile, age, favorite temperature, etc. may be directly input; the encoded multi-modal information is connected to obtain the joint vector, which then is subjected to a full connection layer and a sigmoid activation function to obtain the information representation vector (multi-modal information representation vector) corresponding to the acquired information. For example, the information corresponding to the gender is processed by the gender encoding matrix to obtain a continuous dense vector corresponding to the gender information; the device control authority information of the user is processed by the authority encoding matrix to obtain a continuous dense vector corresponding to the authority information; the favorite channel is processed by the emotion encoding matrix to obtain a continuous dense vector corresponding to the favorite channel.

The following describes in detail the manner in which the at least one target device corresponding to the device control instruction and/or the target function corresponding to the device control instruction is specifically implemented based on the acquired information and the device control instruction:

For the embodiment of the present disclosure, based on the user group information to which the user inputting the device control instruction belongs, the at least one target device corresponding to the device control instruction and/or the target function corresponding to the device control instruction may be determined; the at least one target device corresponding to the device control instruction and/or the target function corresponding to the device control instruction may be determined according to the age information and/or the gender information of the user inputting the device control instruction; the at least one target device corresponding to the device control instruction and/or the target function corresponding to the device control instruction may be determined based on the user group information to which the user inputting the device control instruction belongs, as well as the age information and/or the gender information of the user inputting the device control instruction.

Certainly, based on the acquired information and the device control instruction, and through the trained model, the at least one target device corresponding to the device control instruction and/or the target function corresponding to the device control instruction may be determined. For example, based on the acquired information (multi-modal information) and the device control instruction, and through the trained domain classifier (DC), the at least one target device corresponding to the device control instruction and/or the target function corresponding to the device control instruction may be determined; and/or based on the acquired information (multi-modal information) and the device control instruction, the target function corresponding to the device control instruction is determined through the trained intent classifier (IC).

Specifically, in Step S203, the determining at least one target device corresponding to the device control instruction, includes: performing domain classification processing based on the acquired information and the device control instruction to obtain an execution probability of each device; and outputting the operation result of rejecting to execute the device control instruction if the execution probability of each device is less than a first preset threshold, or otherwise, determining at least one target device corresponding to the device controlling device based on the execution probability of each device.

Specifically, determining at least one target device corresponding to the device controlling device based on the execution probability of each device includes: determining the device corresponding to the maximum probability of each device execution probability as the device corresponding to the device control instruction.

For example, the domain classification result (the execution probability of each device) is 0.91, 0.01, and 0.08 respectively corresponding to device 1, device 2, and device 3, wherein the first preset threshold is 0.5, and the device corresponding to the device control instruction is determined to be device 1.

For another example, if the domain classification result (execution probability of each device) is 0.49, 0.48, or 0.03, wherein each device execution probability is not greater than 0.5, and the operation result of rejecting to execute the device control instruction is output.

For the embodiment of the present disclosure, since the at least one target device corresponding to the device control instruction may be determined by a model (for example, a domain classifier), before determining the at least one target device corresponding to the device control instruction, it may further include: training a model (domain classifier), which the domain classifier will be described in the following as an example.

Specifically, the training data is $(s_i, m_i, d_i)$, wherein $s_i$ represents sentence text of the input data (device control instruction), $m_i$ represents the multi-modal information which includes gender, authority, age and the like of the user inputting the device control instruction, $d_i$ represent the tag of the sentence, that is, the domain to which it belongs (i.e., which device it belongs to), i represents the index of one piece of training data in the training data set, j represents the device index, and $d_{ij}$ represents the probability that the domain of the sentence i is the device j (which may be referred as the execution probability of the device), and $d_i$ is a one-hot encoding form, that is, when the sentence belongs to the j-th device, $d_{ij}$ is 1, and $d_{ik}$ ($k \neq j$) is 0; if the sentence is an override sentence, that is, a user has no control authority for the target device (for example, an 4-year-old user's instruction sentence is "give me bake a sweet potato," while the oven is not allowed for use by children), all elements of $d_i$ are 0, and the loss function on which the training is based is as follows:

$$\text{Loss} = -\sum_{j=0}^{M}\sum_{i=0}^{N} d_{ij}\log\hat{d}_{ij} - \sum_{j=0}^{M}\sum_{i=0}^{N}(1-d_{ij})\log(1-\hat{d}_{ij})$$

Wherein M is the total number of devices, N is the total number of input data sentences, and $\hat{d}_{ij}$ is the predicted output of the model, that is, the probability that the domain of the sentence i predicted by the model is the device j, and the loss is 0 when the predicted output and $d_{ij}$ are completely identical.

When based on the above training method, after training the domain classifier, the domain classification result is obtained based on the acquired information and the device control instructions, and by using the trained the domain classifier. Specifically, the input data is (s, m), wherein s is the text information corresponding to the device control instruction and m is the multi-modal information, and the predicted output $\hat{d}$ (domain classification results) may be obtained by using the trained DC model; $\hat{d}_k$ is the largest element in $\hat{d}$, and if $\hat{d}_k \geq c$ (c is the first preset threshold and may be 0.5), then the sentence is classified as the k-th device, and if $\hat{d}_k < c$, it indicates that the execution probability of all devices is less than the first preset threshold, indicating that the sentence belongs to the protected case, and the user does not have the control authority for the target device, which accordingly the device control instruction may be rejected to perform (for example, an 4-year-old user's instruction sentence is "give me bake a sweet potato," while the oven is not allowed for use by children), wherein all the elements of the sentence tag are 0, and accordingly when predicting by the trained model, the output predicted by the sentence is close to 0 and may be less than the threshold c, thereby resulting in that DC may not give classification and may reject to perform.

Specifically, as shown in FIG. 2B, the input text may be a device control instruction in a text format input by the user, and may also be a device control instruction converted from the device control instruction in voice format input by the user through the voice-text conversion, and the text is subjected to the word encoding (word vector conversion and position encoding) to obtain the encoding vector, then after subjecting to the convolutional neural network and the self-attention model, the text expression vector is obtained. Wherein, the text after converted by the word vector is (w1, w2, w3 . . . ), wherein w1, w2, w3 represents the word vector corresponding to each word in the sentence (device control instruction); the position encoding is a function (f(1), f(2), f(3)) and is a function of the position index of the word vector (specifically, a vector (f(1), f(2), f(3)) is stitched after each word vector, and these vectors are computed by using the function about position, which the function may be implemented in a variety of ways, with more commonly used methods including sin or cos function); and then the two parts are added to obtain the encoding vector (w1+f(1), w2+f(2), w3+f(3) . . . ), which then the obtained encoding vector is subjected to the convolutional neural network and self-attention model to obtain a text expression vector, and the multi-modal information processing module processes the multi-modal information to obtain a multi-modal information representation vector, that is, the information representation vector corresponding to the acquired information; the multi-modal information representation vector and the text expression vector are connected to obtain a joint vector (such as a vector (a1, a2, a3 . . . ), a vector (b1, b2, b3 . . . ), and a vector (a1, a2, a3 . . . , b1, b2, b3, . . . ) after connected); then the joint vector is input into the full connection layer to output the domain classification result: the execution probability of domain A (device A), the execution probability of domain B (device B), and the execution probability of domain C (device C).

Therefore, the difference between the DC model in the present disclosure and the existing DC model is that multi-modal information is added as an input, such that the model may perform domain classification (determining at least one target device) with reference to current user profile information and/or environment information and/or device information. For example, when the temperature of the oven is too high, the user inputs "bake cake for one hour", and domain classifier will not classify the sentence into the oven domain, but will reject to perform it to ensure the safety of the oven and the user.

In the embodiment of the present disclosure, an independent DC model may be separately deployed for each device, that is, each device separately performs domain classification processing. A DC model may also be shared by multiple devices; the model may be deployed in cloud, for example, after a device receives a device control instruction input by a user, the device uploads to cloud, and the cloud performs domain classification according to at least one of the device information, the user information, and the environment information, and the received device control instruction. If the execution probability of each device in domain classification result is less than the first preset threshold, the device that receives the user input may output an operation result of rejecting to execute the device control instruction; if the maximum execution probability in the domain classification result is not less than the first preset threshold, the device with the largest execution probability may be confirmed as the target device, and the instruction is transmitted to the target device for subsequent operations (e.g., intent classification processing, slot tag processing, etc.), or the cloud continues to perform operations such as intent classification processing, and transmits the final operation instruction to the target device for execution. The shared DC model may also be deployed in a terminal, for example, a DC model is deployed in device A. After terminal A receives the device control instruction input by the user, domain classification is performed according to at least one of the device information, the user information, and the environment information, and the received device control instruction. If the execution probability of each device is less than the first preset threshold, it may output an operation result of rejecting to execute the device control instruction; if the maximum execution probability is not less than the first preset threshold, the device with the largest execution probability may be confirmed as the target device, and the instruction is transmitted to the target device for subsequent operations (e.g., intent classification processing, slot tag processing, etc.), or device A continues to perform operations such as intent classification processing, and transmits the final operation instruction to the target device for execution.

For the embodiment of the present disclosure, when the at least one target device is determined based on the acquired information and the device control instruction, the target function corresponding to the device control instruction may be determined based on the acquired information and the device control instruction. In the embodiment of the present disclosure, the target device may be determined first, and then the target function is determined. For example, each smart device may separately deploy with an IC model and share a DC model. In this case, the target device may be determined by the DC model, and then the target function may be determined by the IC model of the target device; the target device and the target function may also be determined at the same time, which the order of execution is not specifically limited herein. The manner of determining the target function corresponding to the device control instruction is as follows:

In Step S203, the determining the target function corresponding to the device control instruction, including: performing intent classification processing based on the acquired information and the device control instruction to determine an execution probability of each control function; outputting the operation result of rejecting to execute the device control instruction if the execution probability of each control function is less than a second preset threshold, or otherwise, determining the target function corresponding to the device control instruction based on the execution probability of each control function.

Specifically, the intent classification processing is performed by a model (intent classifier) based on the acquired information and the device control instruction. In the embodiment of the present disclosure, when a plurality of target devices is determined, the intent classification may be performed only by one model (a shared IC model), and the intent classification may also be performed by using models in the respective target devices.

In the embodiment of the present disclosure, an independent IC model may be separately deployed for each device, that is, each device separately performs domain classification processing. An IC model may also be shared by multiple devices; the model may be deployed in cloud, for example, after a device receives a device control instruction input by a user, the device uploads to cloud, and the cloud performs the intent classification according to at least one of the device information, the user information, and the environment information, and the received device control instruction. If the execution probability of each control function in the intent classification result is less than the second preset threshold, the device which are indicated to receive the user input may output an operation result of rejecting to execute the device control instruction; if the maximum execution probability in the intent classification result is not less than the second preset threshold, the control function with the largest execution probability may be confirmed as the target function, and the instruction is transmitted to the target device for subsequent operations (e.g., slot tag processing, etc.), or the cloud continues to perform operations such as slot tag processing, and transmits the final determined operation instruction to the target device for execution. The shared IC model may also be deployed in a terminal, for example, an IC model is deployed in the device A. After device A receives the device control instruction input by the user, the intent classification is performed according to at least one of the device information, the user information, and the environment information, and the received device control instruction. If the execution probability of each device is less than the second preset threshold, it may output an operation result of rejecting to execute the device control instruction; if the maximum execution probability is not less than the second preset threshold, the control function with the largest execution probability may be confirmed as the target function, and the instruction is transmitted to the target device for subsequent operations (e.g., slot tag processing, etc.), or device A continues to perform operations such as slot tag processing, and transmits the final determined operation instruction to the target device for execution.

Further, since the intent classification processing may be performed by the model (intent classifier), then before performing intent classification processing by the model (intent classifier) based on the acquired information and the device control instruction, the following is further included: training a model (intent classifier), specifically as follows:

The intent classifier is trained by the loss function described below:

$$\text{Loss} = -\sum_{j=0}^{M}\sum_{i=0}^{N} I_{ij} \log \hat{I}_{ij} - \sum_{j=0}^{M}\sum_{i=0}^{N} (1 - I_{ij}) \log(1 - \hat{I}_{ij})$$

Wherein, M is the total number of control functions, N is the total number of input data sentences, j is the function index, and $I_{ij}$ is the probability that the intent of the sentence i is the function j (which may be called the execution probability of the control function), $\hat{I}_{ij}$ is the predicted output of the model, that is, the probability that the model predicts the intent of the sentence i to be the function j, $I_i$ is the tag of the i-th training data, and $I_i$ is in the one-hot encoding form, that is, when the sentence belongs to the j-th function, $I_{ij}$ is 1, $I_{ik}$ (k≠j) is 0. If the training sentence is an override sentence, that is, the user does not have the control authority of the target function (for example, the instruction sentence of the user of age 4 is "uninstall XXAPP on TV', however the function for uninstalling app on the TV is unavailable for using by the child even if the TV is open to the child), then all elements of $I_i$ are 0. When predicted output $\hat{I}_{ij}$ is consistent with $I_{ij}$, loss is 0.

Wherein, when training the intent classifier, the training sample still contains the acquired information (multi-modal information), and the multi-modal information may be initialized by the multi-modal information in the trained domain classifier, for example, the weight of the multi-modal intent classifier may be initialized by some methods (such as using a vector corresponding to some multi-modal information as the weight of the classifier) to speed up the training.

For the embodiment of the present disclosure, after the intent classifier is trained in the above manner, the target function corresponding to the device control instruction may be determined based on the device control instruction input by the user and the acquired information, and through the trained intent classifier. The manner for specifically determining the target function corresponding to the device control instruction is as follows:

The input of the intent classifier is (s, m), wherein s is the text information corresponding to the device control instruction, and m is the multi-modal information. First, the domain (target device) is obtained through the DC model, and then the trained IC model in the domain is used, such that the predicted output $\hat{I}$ may be obtained, and $\hat{I}_k$ is the largest element in the $\hat{I}$. If $\hat{I}_k \geq c$ (c is the set threshold, and may be 0.5), then the classification result of the device control instruction is the k-th function (target function), if $\hat{d}_k < c$, it indicates that the device control instruction belongs to the protected case and will be rejected to execute. If the host sets the authorities of the child, the elderly, the guest, etc. in the user authority database, and the k-th function is just in the mask list, then it will be rejected to execute. As shown in FIG. 4, the device control instruction input by the user includes: an intent A, an intent D, or an intent F. If the host does not set the user authority, the intent classifier directly outputs the intent A, the intent D, or the intent F; if the host sets the user authority (intent A, intent C and intent F are allowed to operate, but intent B, intent D, and intent E are not allowed to operate), then the intent classifier directly outputs intent A and intent F, and rejects to execute intent D.

For example, if the child says "delete the channel list of the TV", the device control instruction will be assigned to the TV domain by domain classifier, but the function of deleting the channel list of the TV is not open to the child. Since the user inputting the sentence is a child, then all the elements of the tag in the sentence are 0 during training, and therefore, when the trained intent classifier predicts according to the user information, the predicted output of the device control instruction is close to 0, and may also be less than the threshold c, so that the intent classifier may not give an intent classification and the target function will be rejected to execute.

Figure 3B:
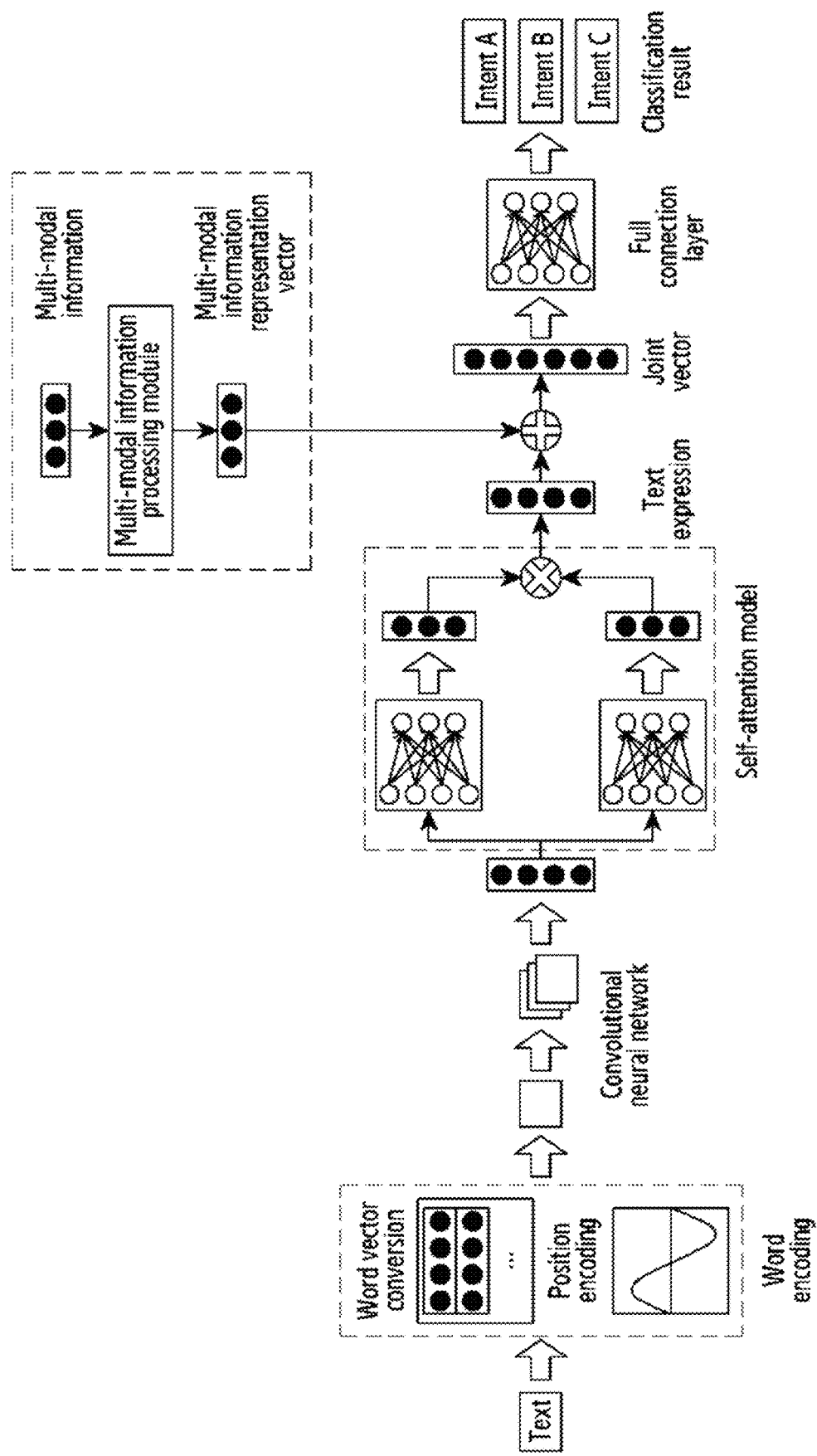
FIG. 3B shows a schematic diagram of obtaining intent classification results by an intent classifier in an embodiment of the present disclosure.

Specifically, as shown in FIG. 3B, the input text may be a device control instruction in a text format input by the user, and may also be a device control instruction converted from the device control instruction in voice format input by the user through the voice-text conversion, and the text is subjected to the word encoding (word vector conversion and position encoding) to obtain the encoding vector, then after subjecting to the convolutional neural network and the self-attention model, the text expression vector is obtained. Wherein, the text after converted by the word vector is (w1, w2, w3 . . . ), wherein w1, w2, w3 represents the word vector corresponding to each word in the sentence (device control instruction); the position encoding is a function (f(1), f(2), f(3)) and is a function of the position index of the word vector; and then the two parts are added to obtain the encoding vector (w1+f(1), w2+f(2), w3+f(3) . . . ), which then the obtained encoding vector is subjected to the convolutional neural network and self-attention model to obtain a text expression vector, and the multi-modal information processing module processes the multi-modal information to obtain a multi-modal information representation vector, that is, the information representation vector corresponding to the acquired information; the multi-modal information representation vector and the text expression vector are connected to obtain a joint vector (such as a vector (a1, a2, a3 . . . ), a vector (b1, b2, b3 . . . ), and a vector (a1, a2, a3 . . . , b1, b2, b3, . . . ) after connected); then the joint vector is input into the full connection layer to output the intent classification result: the execution probability of function A (intent A), the execution probability of function B (intent B), and the execution probability of function C (intent C).

Further, when determining the target function based on the acquired information and the device control instruction and through the intent classifier, the acquired information (multi-modal information) inputting into the intent classifier is actually the corresponding representation vector thereof. In the embodiment of the present disclosure, for details, the manner in which the corresponding information representation vector of the acquired information is obtained by the acquired information, refers to the foregoing embodiments, which will not be described herein again.

It should be noted that if the target device corresponding to the device control instruction is not determined based on the acquired information and the device control instruction (directly outputting an instruction of rejecting to execute the corresponding operation), the target function corresponding to the device control instruction may not be determined, and the device control instruction is not tagged.

Figure 3C:
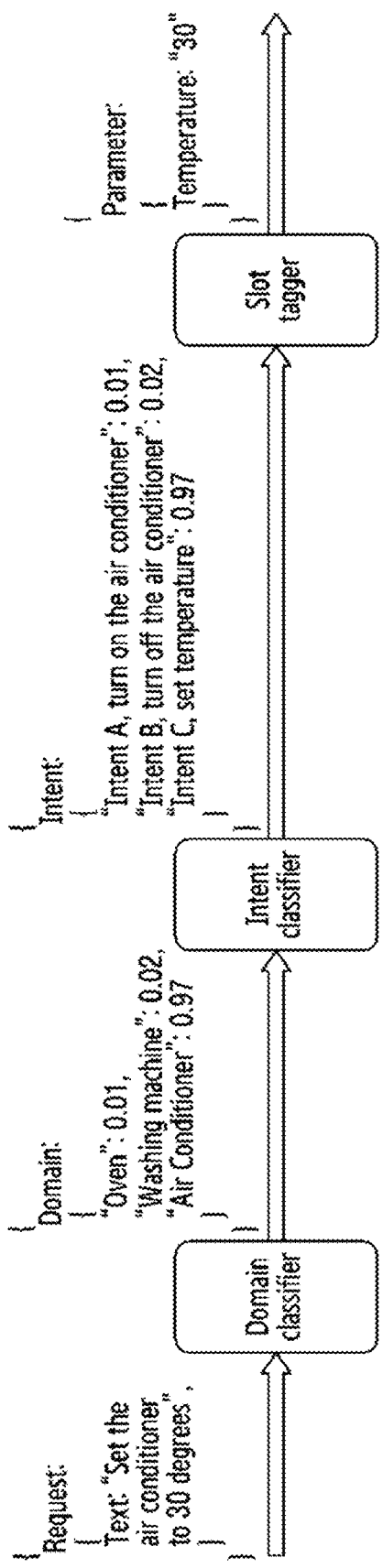
FIG. 3C shows a schematic diagram of performing corresponding operations by a domain classifier, an intent classifier, and a slot tagger according to an embodiment of the present disclosure.

For Step S203, the embodiment of the present disclosure provides a specific example: a child inputs the device control instruction "turn the oven on" by voice, wherein the oven is a device forbidden to be operated by the child, and the operation is rejected by the domain classifier; for another example, a child inputs the device control instruction "delete XXXAPP in the mobile phone" by voice, wherein the mobile phone is a device that allows the child to operate, but the intent of deleting an APP is not allowed to be operated by the child, such that the device control instruction determines the target device is a mobile phone by the domain classifier, and the operation is rejected by the intent classifier. Whereas for the prior art, multi-modal information is not considered, and if a child input the device control instruction "adjusts the air conditioner to 30 degrees centigrade" by voice, then the control instruction "adjusts the air conditioner to 30 degrees centigrade" is processed by the domain classifier to obtain the domain classification result (oven: 0.01; washing machine: 0.02; air conditioner: 0.37), that is, the target device is an air conditioner; the intent classification result is obtained by the intent classifier (intent A, turn on air conditioner: 0.01; intent B, turn off air conditioner: 0.02; intent C, set temperature: 0.97), that is, the target function is to set the temperature, and then through the slot tagger, the parameter information (temperature: "30") in the device control instruction is obtained, as shown in FIG. 3C. Therefore, it may bring a security risk to the device or the user that the device control instruction directly performing the user input in the prior art, and the control of the device is not flexible. The present disclosure determines the target device and/or the target function and/or the target parameter information according to at least one of the device information, the user information, and the environment information, which fully considers various factors that may affect the safe operation of the device, and may also enable the user to be capable of conveniently controlling authorities of the device, which may greatly improve the security and flexibility when the user controlling the device.

Step S204 (not shown in the figure): performing slot tag processing on the device control instruction to obtain target parameter information.

For the embodiment of the present disclosure, the device control instruction is input to the slot tagger (ST) model to perform tag processing on the device control instruction to obtain target parameter information. In the embodiment of the present disclosure, Step S204 in this embodiment may perform tag processing on the device control instruction not based on the acquired information to determine target parameter information.

Wherein, in the step 203, the determining the target function corresponding to the device control instruction based on the acquired information and the device control instruction, and may be executed in parallel with Step S204, or may be performed serially. It is not limited in the embodiment of the present disclosure. Certainly, when the instruction to reject the corresponding operation is output based on the acquired information and the device control instruction in Step S203, Step S204 may not be performed.

Since the slot tag processing is processed by the slot tagger, the model structure of the slot tagger is first introduced:

As shown in FIG. 5, the ST model includes: an encoding layer and a decoding layer, wherein the encoding layer includes: a word encoding layer, a long short-term memory (LSTM) layer, and an attention layer; and the decoding layer includes: an LSTM layer and a multilayer perceptron (MLP) layer. Wherein x1, x2 . . . xm are the user's device control instructions, and the encoding layer also uses a combination of word vector conversion and position encoding, which each word is represented as a vector of a fixed dimension after encoding; the LSTM layer is used for encoding, the features (h1, h2 ... hm) of each word are extracted; y1, y2 ... yk are the taggers corresponding to x1, x2 ... xm (it may use the BMO tag, wherein B means that the vocabulary is the starting position of the parameter, M means that the vocabulary is the middle position or ending position of the parameter, and O means that the vocabulary is not a parameter), and y1, y2 ... yk are represented as the hidden state C after subjecting to the LSTM layer; C and h1, h2 ... hm are used to calculate the vector d through the attention layer, d is subjected to the MLP to obtain the vector f, and f is subjected to MLP to output the tag yk+1 of the next moment (that is, the target parameter information). Wherein, EOS (end of sentence) in FIG. 5 indicates the end of a sentence.

Therefore, the device control instruction is subjected to slot tag processing by an ST model (Viterbi decoding method) to obtain target parameter information.

Further, since the ST model is the trained ST model in the tagger processing on the device control instruction by the ST model, before the device control instruction is performed with tag processing by the ST model, the method further includes: training the ST model through the training sample and the loss function, which specifically is as follows:

The training sample set is $(s_i, y_i, c_i, v_i, m_i)$, wherein $s_i$ represents the text information corresponding to the input device control instruction, $y_i$ represents the BMO tag of the instruction (for example, $S_i$ is "set the air conditioner to 30 degrees centigrade", $y_i$ is "O O O O B M"), and i is the index of each piece of data in the training sample set. The training loss function is:

$$Loss = -\sum_{j=0}\sum_{i=0} y_{ij} \log \hat{y}_{ij}$$

Wherein $y_{ij}$ represents the BMO tag of the j-th word of the i-th training sample, $\hat{y}_{ij}$ is the BMO result of the j-th word of the i-th training sample predicted by the model.

Step S205 (not shown in the figure): controlling the at least one target device to perform a corresponding operation based on the at least one target device and/or the target function and/or target parameter information.

For the embodiment of the present disclosure, after determining at least one target device and/or the target function and/or target parameter information by Step S203, Step S204, and Step S205, at least one target device is controlled to perform a corresponding operation.

For example, if the device control information input by the user is "adjust the air conditioner temperature to 30 degrees centigrade", the target device is an air conditioner, the target function is to adjust the temperature, and the target parameter information is 30 degrees centigrade, thereby the air conditioner being controlled to adjust the temperature to 30 degrees centigrade according to the determined information.

Further, since the operation result of rejecting to execute the device control instruction is directly output due to the existence of the domain classifier and the intent classifier, the present embodiment may further include Step S206, wherein:

Step S206 (not shown in the figure): outputting the operation result of rejecting to execute the device control instruction, based on the acquired information and the device control instruction.

Specifically, the outputting the operation result of rejecting to execute the device control instruction includes: outputting the operation result of rejecting to execute the device control instruction, when determining that at least one of the following is satisfied according to the acquired information:
the user possessing no control authority for the at least one target device; the user possessing no control authority for a target function corresponding to the device control instruction; the at least one target device not satisfying an execution condition corresponding to the device control instruction; and a working environment of the at least one target device not satisfying an execution condition corresponding to the device control instruction. Wherein, the above execution condition may be preset, for example, the execution condition for adjusting the air conditioner temperature to 30 degrees centigrade may be that the ambient temperature is lower than 30 degrees centigrade, or the execution condition for adjusting the oven temperature to 260 degrees centigrade may be that the continuous running time of the oven is less than 3 hours.

For example, the device control instruction input by the child is "to increase the oven temperature to 240 degrees centigrade". Based on the acquired user information, it may be known that the input user of the device control instruction is a child, and it may be known from the authority database that the child cannot operate the oven, that is, the child does not have the control authority of the target device, and it directly rejects to perform the operation corresponding to the device control instruction;

For another example, the device control instruction input by a child is "delete XX application on the TV", it may be known that the user of the device control instruction is a child based on the acquired user information, and it may be known from the authority database that that the child is able to operate the TV, but unable to "delete an application" (target function), that is, the child does not have the control authority for the target function, thereby directly rejecting to perform the operation corresponding to the device control instruction;

For another example, if an air conditioner does not have the function of "dehumidification", and the device control instruction input by the user is "turn on the dehumidification function of the air conditioner", that is, the air conditioner does not satisfy the execution condition "dehumidification" corresponding to the device control instruction, then the operation corresponding to the device control instruction is directly rejected to perform.

Still for another example, if the current indoor temperature is 30 degrees centigrade or it is currently in summer, and the device control instruction input by the user is "adjust the air conditioner temperature to 32 degrees centigrade", that is, the working environment of the air conditioner does not satisfy the execution condition corresponding to the device control instruction, then the operation corresponding to the device control instruction is directly rejected to perform.

For the embodiment of the present disclosure, when it is determined that the operation result of the device control instruction is not performed based on the acquired information and/or the device control instruction, the operation may not be performed, and a notification message is output to notify the current rejection to perform the control instruction, or alternatively, it is possible to simply not perform the corresponding operation.

Figure 6A:
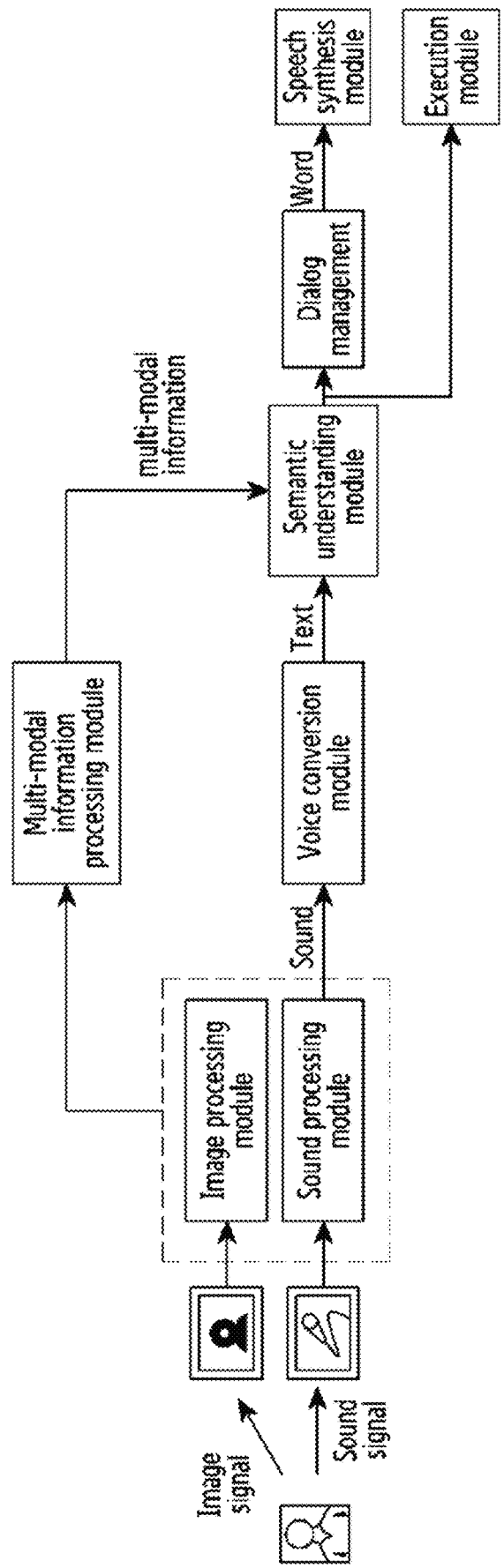
FIG. 6A shows a schematic diagram of a device control system corresponding to Embodiment 1 of the present disclosure.
Figure 6B:
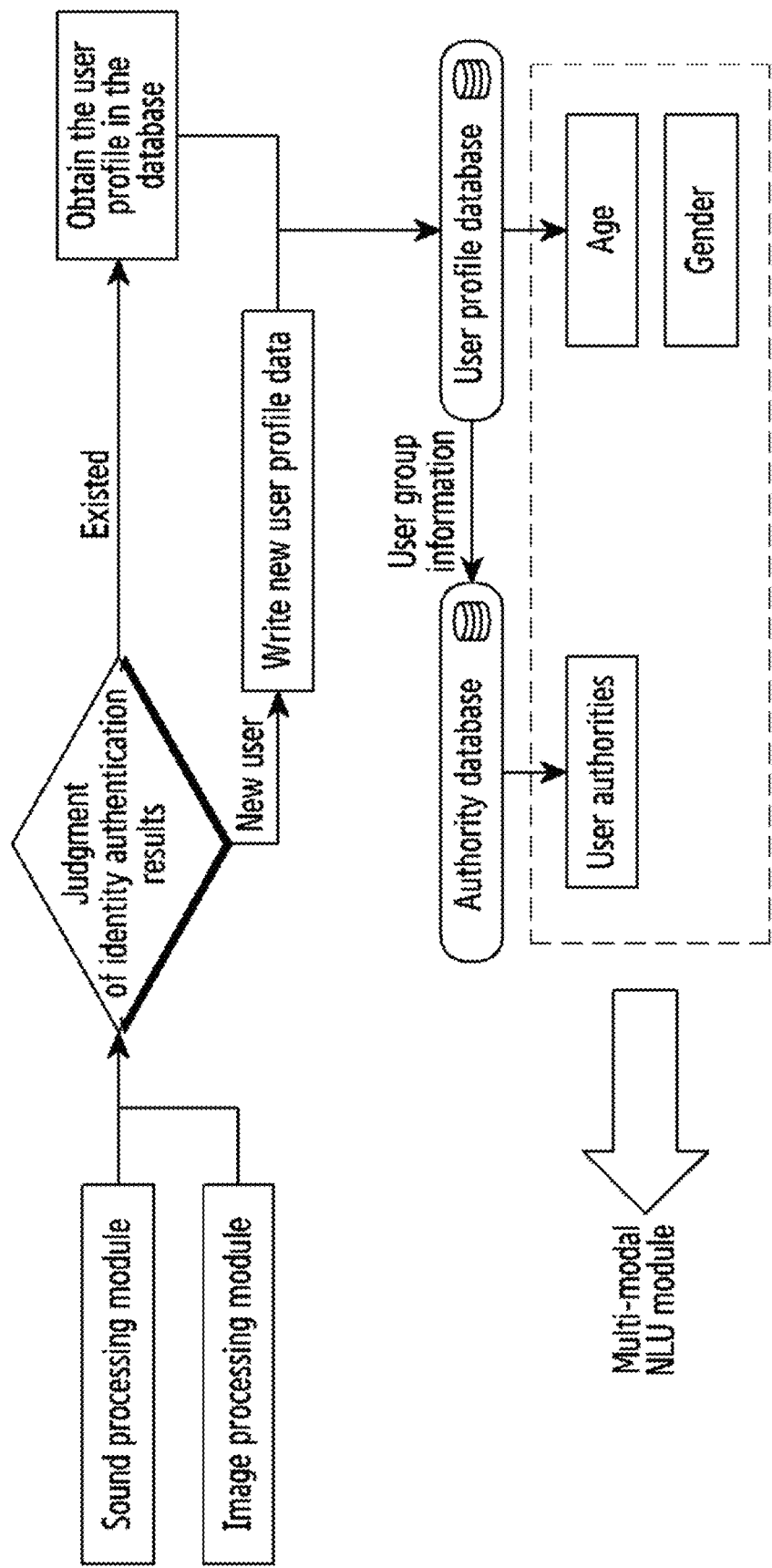
FIG. 6B shows a schematic diagram of a multi-modal information processing module according to Embodiment 1 of the present disclosure.

Further, a device control system is introduced for Embodiment 1 (taking that the user inputs the device control instruction by voice as an example), as shown in FIG. 6A, the system is divided into a sound processing module, an image processing module, and a multi-modal information processing module, speech conversion module, semantic understanding module, dialog management (DM) module, speech synthesis module, execution module. The speech conversion module may be referred to as an auto speech recognition (ASR) module, the semantic understanding module may be referred to as a natural language understanding (NLU) module, and the speech synthesis module may be referred to as a text to speech (TTS) module; further, a natural language generation (NLG) module may also be included in the DM module. Wherein, after the audio collecting apparatus (microphone) collects the sound signal, the sound processing module performs noise cancellation and identity recognition, and outputs the sound signal and the identity authentication information after the noise cancellation processing. After the camera captures the image information, the image processing module performs face extraction and face recognition, and outputs identity authentication information. Through the above image processing modules, the identity authentication information output by the sound processing module is integrated into multi-modal information through the multi-modal information processing module; the sound signal output by the sound processing module is converted into text information by the speech conversion module; the text information and the multi-modal information is input to the semantic understanding module, and the semantic understanding module outputs the domain (target device), the intent (target function) and the tagger (target parameter information) of the sentence to the dialog management module and the execution module; the dialog management module generates a reply text which will be synthesized by the speech synthesis module to give a reply; the corresponding operation is performed by the execution module. The prior art does not consider image signals and identity authentication, and does not consider multi-modal information when performing semantic understanding (FIG. 6A only shows the example of multi-modal information containing user information, and the multi-modal information in the application may also contain the device information and/or the environment information, which is not shown in FIG. 6A). Specifically, the multi-modal information processing module is described in detail:

The function of this module is to process the information obtained by the sound processing module and the image processing module, and to compile processes to obtain multi-modal information. The structure of the module is as shown in FIG. 6B, and the multi-modal information includes user image information (including age, gender, etc.) acquired by the user profile database and user authority data (user device control authority) acquired from the authority database. Specifically, when the sound processing module and the image processing module both collect corresponding signals, the identity authentication uses the face authentication information output by the image processing module to compare and authenticate with the user face recognition template of each user in the user profile database and determines the identity of the user; if the authentication is passed, that is, the user is determined to be an existing user according to the identity authentication result, the user profile of the user in the user profile database is obtained and outputted, including gender, age, user group, etc.; if the identity authentication fails, that is it is judged as a new user according to the identity authentication result, new user profile data is created and written in the user profile database, the gender and age data obtained by the sound processing module and the image processing module are written, and the newly created user profile data is output, including gender, age, user group, etc. According to the output user group in the user profile data, the user authority of the corresponding user group is queried in the authority database and then is output. The user authority output and user profile data are integrated into the multi-modal information. The multi-modal information is output to a semantic understanding module, that is, a natural language understanding (NLU) module, which may also be referred to as a multi-modal NLU module.

Figure 7:
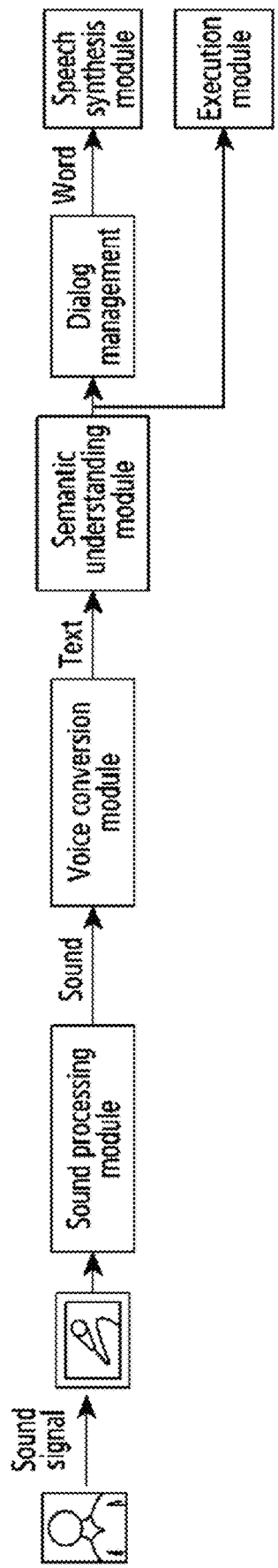
FIG. 7 shows a schematic diagram of a device control system in the prior art.

Wherein, the system architecture diagram of the prior art is shown in FIG. 7, in which the sound signal is converted into text by the speech conversion module after being processed by the sound processing module, and the text is processed by the semantic understanding module to obtain the domain, the intent and the tagger of the sentence which are output to the dialog management module and the execution module, and the dialog management module generates a reply text that is synthesized by the speech synthesis module to give a reply; and the operation is performed by the execution module. Therefore, it may bring a security risk to the device or the user that the device control instruction directly performing the user input in the prior art, and the control of the device is not flexible. The present disclosure determines the target device and/or the target function and/or the target parameter information according to at least one of the device information, the user information, and the environment information, which fully considers various factors that may affect the safe operation of the device, and may also enable the user to be capable of conveniently controlling authorities of the device, which may greatly improve the security and flexibility when the user controlling the device.

Embodiment 2

This embodiment mainly introduces that based on the acquired user information and/or environment information and/or device information, it is determined whether the parameter information in the device control instruction input by the user is necessary to be changed, and if necessary, the changed parameter information is output to solve the above technical problem 2 (wherein, in the embodiment, when determining the at least one target device and/or the target function corresponding to the device control instruction, the acquired information (including: user information, environment information, and device information) may be disregarded), specifically as follows:

Step S301 (not shown in the figure): acquiring a device control instruction input by the user.

For the embodiment of the present disclosure, the manner of acquiring the device control instruction input by the user in Step S301, refers to the above Step S201. It will not be described in detail in this embodiment.

Step S302 (not shown in the figure), determining at least one target device corresponding to the device control instruction and/or a target function corresponding to the device control instruction based on the acquired device control instruction.

For the embodiment of the present disclosure, the determining the at least one target device corresponding to the device control instruction and/or the target function corresponding to the device control instruction based on the acquired device control instruction, includes: determining the at least one target device corresponding to the device control instruction based on the acquired device control instruction and the domain classifier; determining the target function corresponding to the device control instruction based on the acquired device control instruction and the intent classifier.

Figure 8:
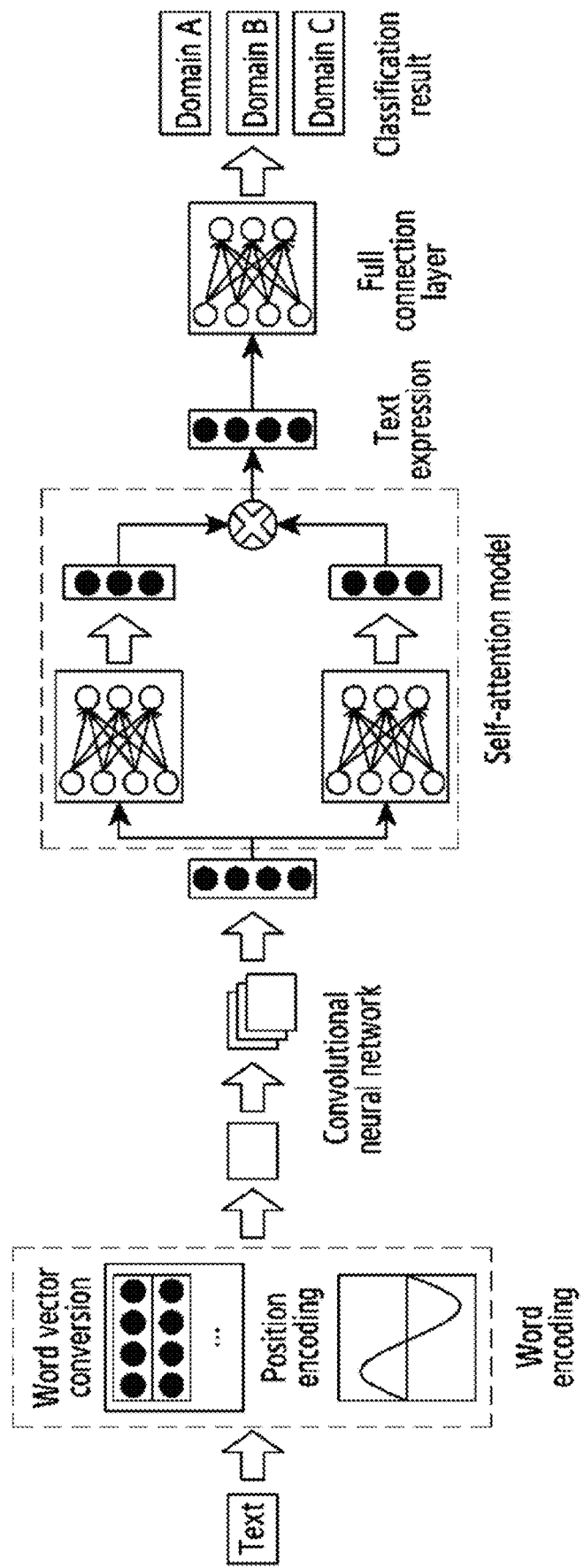
FIG. 8 shows a schematic diagram of obtaining domain classification results by using a domain classifier in Embodiment 2 of the present disclosure.

For the embodiment of the present disclosure, the model structure of the domain classifier is shown in FIG. 8, wherein the input text is a device control instruction in a text format input by the user, or a device control instruction in a text format converted from the device control instruction in the voice format input by the user through the voice-text conversion, and the device control instruction in a text format is processed through word encoding (word vector conversion and position encoding) to obtain the encoding vector, which then is processed through the convolutional neural network and the self-attention model to obtain the text expression vector. Wherein, the word vector is converted as (w1, w2, w3 . . . ), wherein w1, w2, w3 . . . represents the word vector corresponding to each word in the device control instruction; the position encoding is a function (f(1), f(2), f(3)), and is a function of the position index of the word vector; the two parts are added to obtain the encoding vector (w1+f(1), w2+f(2), w3+f(3) . . . ), which is input into the full connection layer to output the classification results: the execution probability of domain A (device A), the execution probability of domain B (device B), and the execution probability of domain C (device C). The device with the highest execution probability is selected as the target device.

Wherein, the model structure of the domain classifier may also adopt the structure shown in FIG. 2B, that is, the multi-modal information processing module processes the multi-modal information to obtain a multi-modal information representation vector, which is connected with the text expression vector to obtain a joint vector, and the joint vector is input into the full connection layer to output the domain classification result.

Figure 9:
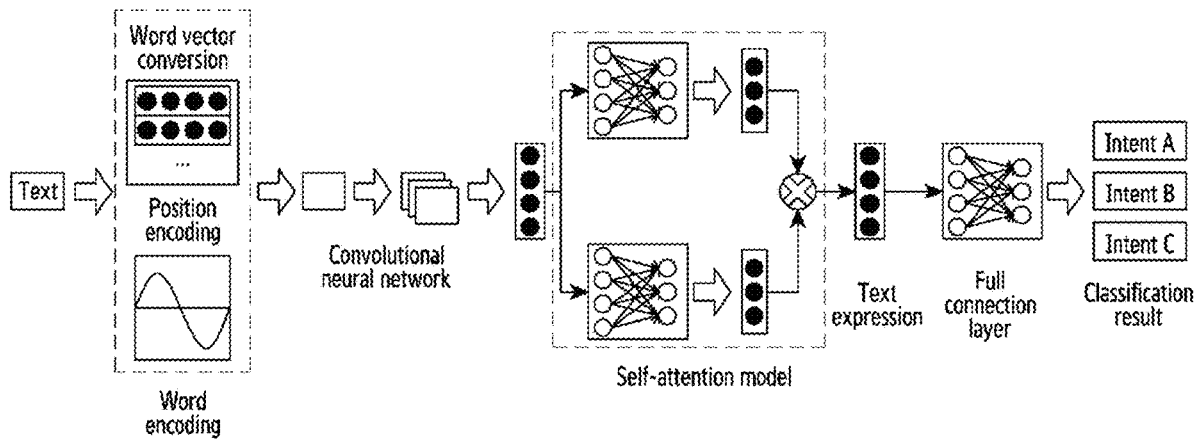
FIG. 9 shows a schematic diagram of obtaining intent classification results by an intent classifier in Embodiment 2 of the present disclosure.

For the embodiment of the present disclosure, the structure of the intent classifier (IC) is as shown in FIG. 9, which is mainly used to determine a target function corresponding to the device control instruction based on the device control instruction. The structure of the IC is consistent with DC, wherein the input text is a device control instruction in a text format input by the user, or a device control instruction in a text format converted from the device control instruction in the voice format input by the user through the voice-text conversion, and the device control instruction in a text format is subjected to word encoding (word vector conversion and position encoding) to obtain the encoding vector, which then is subjected to the convolutional neural network and the self-attention model to obtain the text expression vector. Wherein, the word vector is converted as (w1, w2, w3 . . . ), wherein, w1, w2, w3 . . . represents the word vector corresponding to each word in the device control instruction; the position encoding is a function (f(1), f(2), f(3)), and is a function of the position index of the word vector; the two parts are added to obtain the encoding vector (w1+f(1), w2+f(2), w3+f(3) . . . ), which is input into the full connection layer to output the intent classification results: the execution probability of function A (intent A), the execution probability of function B (intent B), and the execution probability of function C (intent C).

Wherein, the model structure of the intent classifier may also adopt the structure shown in FIG. 3B, that is, the multi-modal information processing module processes the multi-modal information to obtain a multi-modal information representation vector, which is connected with the text expression vector to obtain a joint vector, and the joint vector is input into the full connection layer to output the intent classification result.

Further, the number of the domain classifier may be one, that is, the shared domain classifier, the number of the intent classifier is multiple (i.e., each device corresponds to one intent classifier), and the number of the domain classifier and the intent classifier is respectively one, for example performing domain classification and intent classification in cloud. It is not limited in the embodiment of the present disclosure.

In the embodiment of the present disclosure, when the at least one target device corresponding to the device control instruction is determined based on the domain classifier, the used domain classifier is a pre-trained domain classifier; and when the target function corresponding to the device control instruction is determined based on the intent classifier, the intent classifier used is also pre-trained. The specific training manner is: training the domain classifier based on a plurality of first training data; and training the intent classifier based on a plurality of second training data, wherein any first training data includes a device control instruction and a tagger of the domain (target device) corresponding to the device control instruction, and any second training data includes a device control instruction and a tagger of the target function corresponding to the device control instruction. A more specific training manner will not be described in the embodiment of the present disclosure.

Step S303 (not shown in the figure): acquiring at least one of the following information: the user information, the environment information, and the device information.

The embodiment of the present disclosure does not limit the execution order of Step S301, Step S302, and Step S303.

Figure 10:
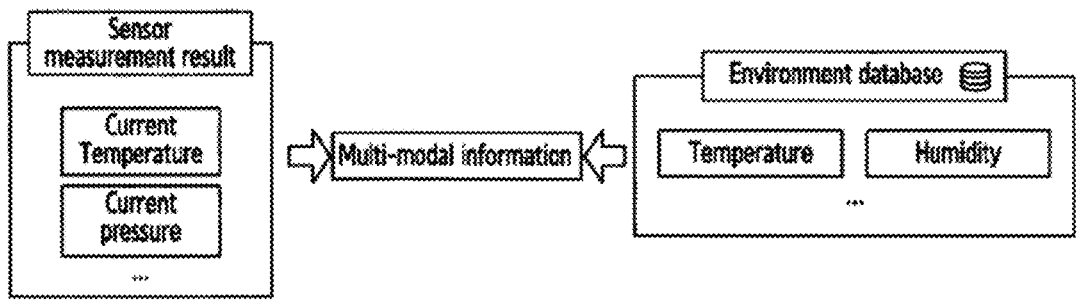
FIG. 10 shows a schematic diagram of acquiring environment information and device information of multi-modal information in an embodiment of the present disclosure.

For the manner of acquiring at least one of the user information, the environment information, and the device information in the embodiment of the present disclosure, refers to Embodiment 1. Wherein in Embodiment 1, the manner of acquiring the user information is mainly introduced. In the embodiment of the present disclosure, the manner of acquiring the environment information is mainly introduced. Specifically, as shown in FIG. 10, the environment information (including the temperature of the current environment, the air pressure of the current environment, and the like) is collected by a sensor, and the environment database stores an appropriate environment parameter (which may also be referred to as optimal working environment information). In addition, the device information may be obtained in the same manner, such as collecting device information (including current operating temperature of the device, working humidity, etc.) and an appropriate operating parameter stored in the device database (which may also be referred to as optimal working state information) to obtain the multi-modal information by the obtained device information and/or environment information.

Step S304 (not shown in the figure): performing tag processing on the device control instruction to obtain the target parameter information based on the acquired information.

For the embodiment of the present disclosure, Step S304 may specifically include Step S3041 (not shown in the figure), wherein, Step S3041: obtaining the target parameter information based on the acquired information and the device control instruction and through the slot tagger.

Wherein, the target parameter information includes any one of the following: the parameter information after the parameter information in the device control instruction is changed by the slot tagger and the parameter information in the device control instruction.

For the embodiment of the present disclosure, if the device control instruction satisfies the preset condition, the target parameter information is the parameter information after the parameter information in the device control instruction is changed by the slot tagger; if the device control instruction does not satisfy the preset condition, the target parameter information is the parameter information in the device control instruction.

Wherein, the preset condition includes at least one of the following:
  the parameter value is not contained in the device control instruction;
  the parameter value contained in the device control instruction does not belong to the parameter value in the parameter value range determined by the acquired information.

Further, Step S3041 may specifically include: Step S30411 (not shown in the figure), Step S30412 (not shown in the figure), and Step S30413 (not shown in the figure), wherein,
  Step S30411: performing slot tag processing on the device control instruction to obtain the parameter information in the device instruction.
  Step S30412: determining whether to change the parameter information in the device control instruction based on the device control instruction and the acquired information.

Specifically, Step S30412 may include: obtaining, by logistic regression processing, the logistic regression result based on the parameter information in the device control instruction and the acquired information; determining whether to change the parameter information in the device control instruction based on the logistic regression result.

Step S30413: if changed, determining the changed target parameter information based on the parameter information in the device control instruction and the acquired information.

Specifically, in Step S30413, determining the changed target parameter information based on the parameter information in the device control instruction and the acquired information may include: obtaining, by linear regression processing, the linear regression result based on the parameter information in the device control instruction and the acquired information; determining the changed parameter information based on the linear regression result. In the embodiment of the present disclosure, based on the parameter information in the device control instruction and the acquired information, the prediction result is obtained by fitting the prediction function, and the preset result may include: whether to change the parameter information in the device control instruction and at least one of changed parameter information. The prediction function may take many forms. Specifically, the fitting prediction function may be a linear function, wherein linear regression processing is performed to obtain a linear regression result when the fitting prediction function is a linear function; the fitting prediction function may also be an exponential function, the logistic regression is performed to obtain a logistic regression result when the fitting prediction function is an exponential function; further, the fitting prediction function may also be a polynomial function, the similar linear regression processing is performed to obtain a similar linear regression result when the fitting prediction function is a polynomial function. In the embodiment of the present disclosure, the prediction function may further include other functions, which is not limited herein.

For the embodiment of the present disclosure, if the parameter information in the device control instruction needs to be changed, the output result of the slot tagger includes the changed parameter information, and may also include: the indication information corresponding to the changed parameter information, and parameter information in the device control instruction.

For the embodiment of the present disclosure, if not changed, the target parameter information is determined as the parameter information in the device control instruction; further, if the parameter information in the device control instruction does not need to be changed, the output result of the slot tagger includes: the indication information corresponding to the unchanged parameter information, and parameter information in the device control instruction.

Figure 11:
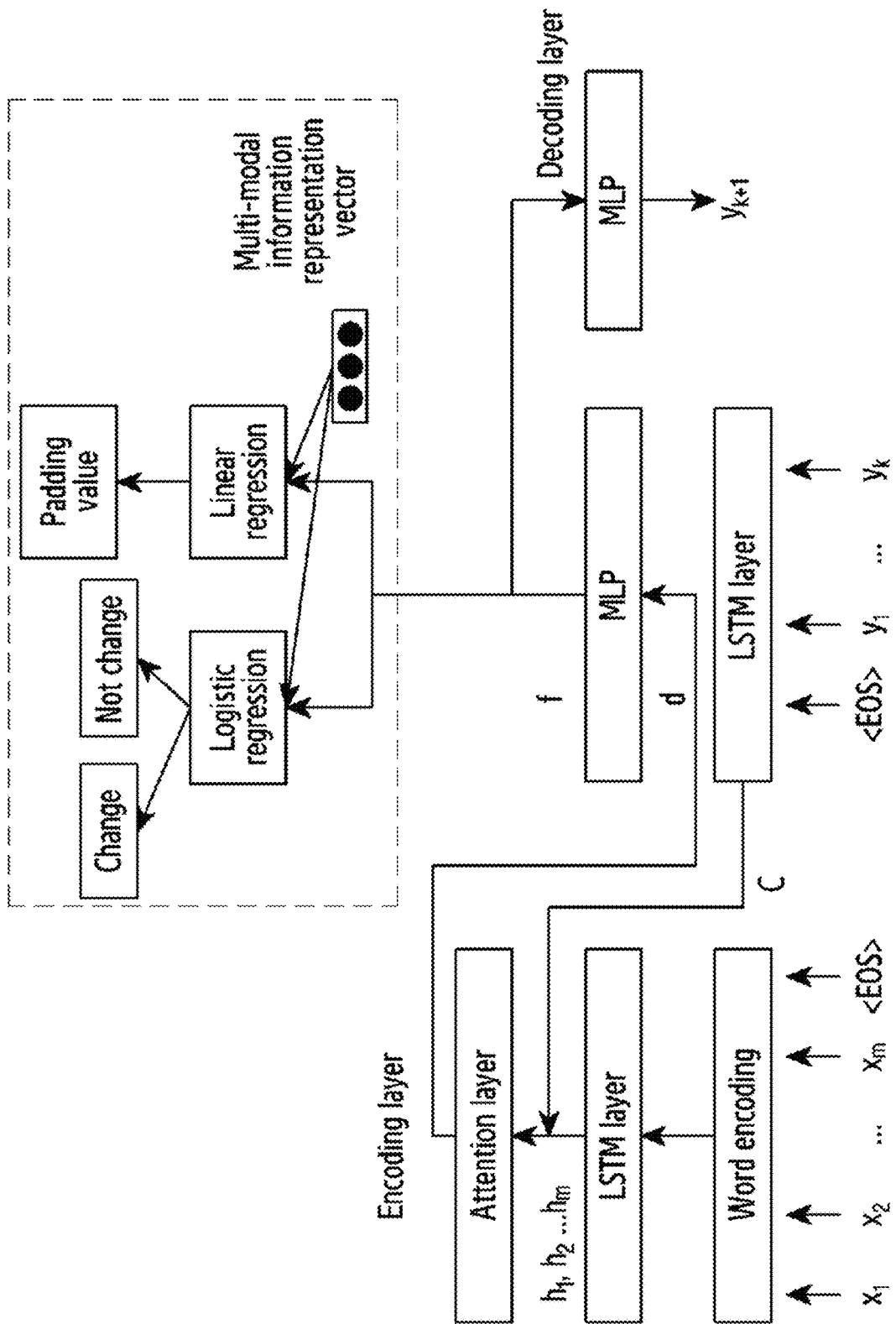
FIG. 11 shows a schematic diagram of slot tag processing performed by the slot tagger in Embodiments 2 and 3 of the present disclosure.

For the method of determining whether the parameter information in the device control instruction is changed or not, and the changed parameter information in the device control instruction by means of logistic regression and linear regression in Step S30411 to Step S30413, the specific process of the slot tagger for slot tagging is introduced in FIG. 11: the encoder and decoder structure, wherein x1, x2 ... xm are the user's device control instructions, and the encoding layer also uses a combination of word vector conversion and position encoding, which each word is represented as a vector of a fixed dimension after encoding; the LSTM layer is used to encode, the features (h1, h2 ... hm) of each word is extracted; y1, y2 ... yk are the taggers corresponding to x1, x2 ... xm (it may use the BMO tag, wherein B means that the vocabulary is the starting position of the parameter, M means that the vocabulary is the middle position or ending position of the parameter, and O means that the vocabulary is not a parameter), and y1, y2 ... yk are represented as the hidden state C by the LSTM layer; C and h1, h2 ... hm are used to calculate the vector d through the attention layer, d is subjected to MLP to obtain the vector f, and f is subjected to MLP to output the tag yk+1 of the next moment (target parameter information in the device control instruction). At the same time, the vector f and the information representation vector (multi-modal information representation vector) corresponding to the acquired information are subjected to logistic regression and linear regression to obtain the logistic regression result and the linear regression result, respectively. Wherein, the EOS (End of Sentence) in FIG. 11 indicates the end of the sentence.

Wherein, the logistic regression result determines whether the parameter is changed at time k+1 (i.e., the output result is changed or not changed), and the linear regression result determines the changed value (i.e., the padding value).

For the embodiment of the present disclosure, the logistic regression result determines whether the parameter is changed, and the linear regression result determines the changed value, such that the network has an ability to rewrite the parameter.

For example, the device control instruction input by the user is "set the air conditioner to 100 degrees centigrade", the instruction is classified into the air conditioner domain by the domain classifier, and the intent classifier assigns it to the intent of "setting air conditioner temperature"; since the air temperature cannot be set by 100 degrees centigrade, the air conditioner cannot be executed, and therefore, after the parameter is tagged by the slot tagger model in the embodiment of the present disclosure, the upper limit temperature of the air conditioner in the environment database is rewritten to 30 degrees centigrade from 100 degrees centigrade after the logistic regression and the linear regression (or changed to a user preferred temperature of 26 degrees centigrade in the user profile database). Then the parameter is passed to the air conditioner for execution, thereby increasing the indoor temperature and be more in line with the semantics of "setting the air conditioner to 100 degrees centigrade". For another example, the user sentence is "turn the oven up to 240 degrees centigrade", and the device monitoring module monitors that the current oven has a higher operating temperature and a longer working time, and passes the information to the multi-modal information representation vector; the ST tagging model tags the parameter as 240 degrees centigrade, and the parameter is rewritten in combination with the multi-modal information representation vector to output 200 degrees centigrade for the oven to execute.

However, when the MLP in the existing slot tagging model obtains the tag yk+1 at the next moment, it directly serves as an output result, and is not subjected to logistic regression and linear regression, which may result in the device failing to accurately execute the device control instruction or execution result binging danger to the user or the device. Based on the linear regression and the logistic regression, the unreasonable parameter information or the unclear parameter information in the device instruction information may be changed into reasonable and clear parameter information, thereby improving the safety of the operation of the device, reducing the risk of device failure, and improving the flexibility of the control of the device, which thus improves the user experience.

Further, before the target parameter information is obtained based on the acquired information and the device control instruction and through the slot tagger, the method further includes: acquiring a plurality of training data; and training the slot tagger based on the acquired training data and by the target loss function.

Wherein, any training data includes the following information:
the device control instruction; the slot tagging result corresponding to the device control instruction; information indicating whether to change the parameter in the device control instruction; the changed parameter information; the acquired information.

Further, before training the slot tagger based on the acquired training data and through a target loss function, the method further includes: determining the target loss function.

Wherein, the determining the target loss function includes: determining a first loss function based on the slot tagging result corresponding to the device control instruction in each training data and the predicted tagging result of the slot tagger; determining a second loss function based on the information indicating whether the parameter in the device instruction in each training data has been changed and the information indicating whether changed predicted by the model; determining a third loss function based on the changed parameter information in each training data and the changed parameter information output by the slot tagger; and determining the target loss function based on the first loss function, the second loss function, and the third loss function.

Specifically, the training data set used for training the slot tagger may be $(s_i, y_i, c_i, v_i, m_i)$, wherein $s_i$ represents the text information corresponding to the input device control instruction, $y_i$ represents the BMO tag corresponding to the device control instruction (for example, $S_i$ is "set the air conditioner to 30 degrees centigrade", $y_i$ is "O O O O B M"), $c_i$ is 0 or 1 (0 means that there is no parameter to be changed, and 1 means the parameter needs to be modified), $v_i$ means the changed padding value (the changed target parameter information), $m_i$ represents the multi-modal information (acquired information) (including a current sensor measurement, an appropriate value and an executable range of the device, etc.), and $c_i$ is the index of each piece of data in the training data set.

Further, the trained loss function is:

$$Loss = -\sum_{j=0}^{M}\sum_{i=0}^{N} y_{ij}\log \hat{y}_{ij} - \alpha\sum_{i=0}^{N} c_i \log \hat{c}_1 - \beta\sum_{i=0}^{N} (v_i - \hat{v}_1)^2$$

Where M is the total number of words in the training data, N is the total number of sentences in the input data, the first item in Loss indicates the tagging error, $y_{ij}$ indicates the BMO tag of the j-th word of the i-th training data, $\hat{y}_{ij}$ is the BMO result of the j-th word of the i-th training data predicted by the model; the second term in Loss is the parameter correction error, $c_i$ indicates whether the parameter needs to be changed, $c_i=0$ indicates that the parameter does not need to be changed, $c_i=1$ indicates that the parameter needs to be changed; the third item in Loss is the square of the difference between the changed value $\hat{v}_i$ output by the model and the tag modification value $v_i$, wherein $\alpha$ and $\beta$ are coefficients.

Step S305 (not shown in the figure): controlling at least one target device to perform the corresponding operation based on the at least one target device and/or the target function and/or the target parameter information.

For the embodiment of the present disclosure, based on at least the target device and/or the target function determined in Step S302, and the target parameter information obtained by Step S304 (Step S30411 to Step S30413), the at least one target device is controlled to perform a corresponding operation.

The following describes a specific example for Embodiment 2:

The text information corresponding to the device control instruction input by the user is "set the air conditioner to 100 degrees centigrade", which is directly classified into the air conditioner domain by the domain classifier, the intent classifier directly assigns the control instruction to the intent of "set air conditioner temperature", and the slot tagger tags "100" as the parameter. At the same time, the device information contained in the multi-modal information contains the maximum temperature of the air conditioner of 32 degrees centigrade and the suitable temperature of 29 degrees centigrade. The parameter rewrites that the output $c_i$ of the network logistic regression is greater than 0.5 and the linear regression output $v_i$ is 32 degrees centigrade; the parameter is rewritten, and the output result of 32 degrees centigrade of the linear regression is transmitted to the air conditioner for execution.

Figure 12:
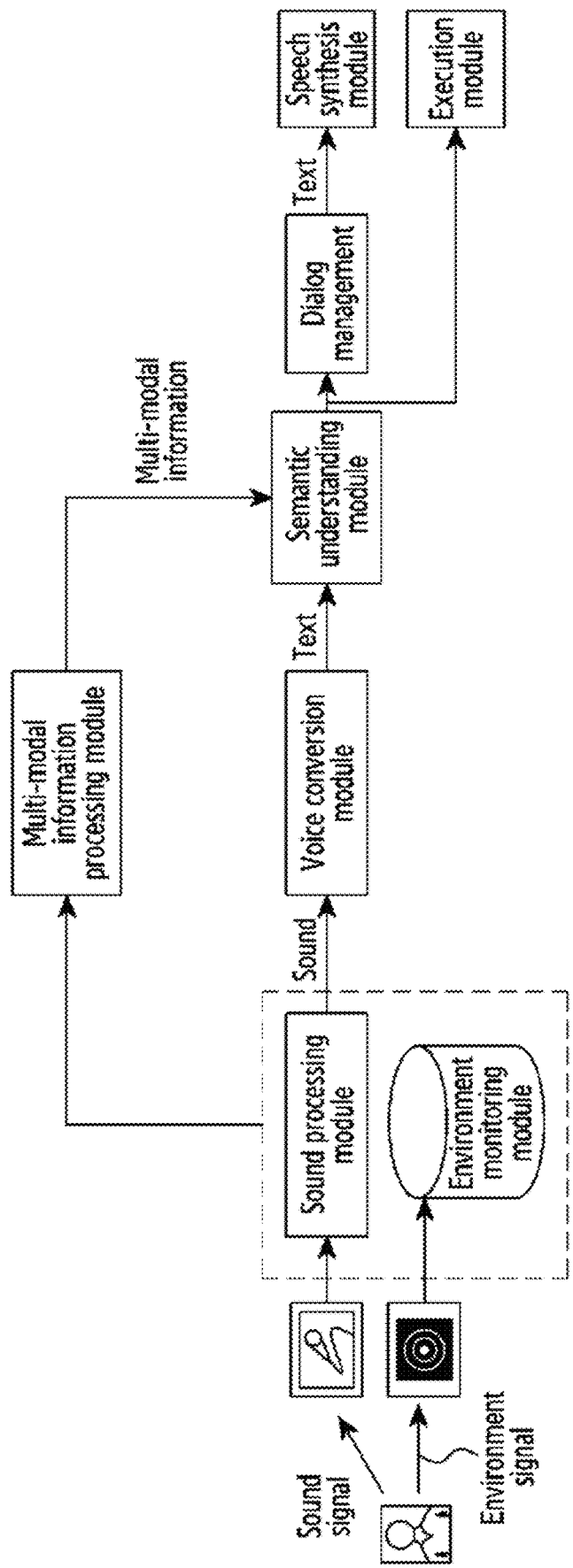
FIG. 12 shows a schematic structural diagram of a device control system in Embodiment 2 of the present disclosure.

Further, a device control system is introduced for Embodiment 2 (taking that the user inputs the device control instruction by voice as an example), the user's voice signal and environment signal (such as indoor temperature, indoor air quality, etc.) are collected to finally constitute a semantic understanding of the user, give voice feedback and execute the corresponding instructions. In FIG. 12, the system is divided into a sound processing module, an environment monitoring module, and a multi-modal information processing module, speech conversion module, semantic understanding module, dialog management module, speech synthesis module, execution module. After the audio collecting apparatus (microphone) collects the sound signal, the sound processing module performs noise cancellation, and outputs the sound signal after the noise cancellation processing; the sensor collects environment information including temperature and humidity; and the information output by the above sound processing module and the environment monitoring module is integrated into multi-modal information by the multi-modal information processing module. FIG. 12 only shows the example of the multi-modal information containing the environment information, and the multi-modal information in the present disclosure may further contain the device information and/or the user information which not shown in FIG. 12; the sound signal output by the sound processing module is converted into text information by the speech conversion module; both the text information and the multi-modal information is input to the semantic understanding module, and the semantic understanding module outputs the domain, the intent and the tagger of the sentence to the dialog management module and the execution module; the dialog management module generates a reply text which will be synthesized by the speech synthesis module to give a reply; the corresponding operation is performed by the execution module.

Specifically, the dialog management module is for generating a reply according to the result of the semantic understanding module (including the domain to which the device control instruction belongs (target device), the target function, and the tagging result (target parameter information)). This part may be manually designed to reply, or may be replied through the trained model, which will not be described again.

The speech synthesis module converts the result of the dialog management module into audio output, which will not be described again.

The execution module is for executing the hardware device of the user's device control instruction, and the execution module is deployed in a smart terminal (including a smart home device, a mobile phone, etc.).

Wherein, the system architecture diagram of the prior art is shown in FIG. 7. Wherein the sound signal performed by noise cancellation via the sound processing module is converted into text information by the speech conversion module; the text is processed by the semantic understanding module, to obtain and output the domain, the intent and the tagger of the sentence to the dialog management module and the execution module; the dialog management module generates a reply text which will be synthesized by the speech synthesis module to give a reply; the corresponding operation is performed by the execution module. Therefore, the prior art directly performs according to the parameter information in the device control instruction input by the user, which may cause a security risk to the device or the user, or may result in the device failing to perform the corresponding operation accurately when the parameter is unclear. The present disclosure adjusts the target parameter information according to at least one of the device information, the user information, and the environment information, which fully considers various factors that may affect the safe operation of the device, and may also enable the corresponding operations to be performed according to the changed parameters when the parameters in the instruction are unclear or unsafe, which may greatly improve the security and flexibility when the user controlling the device.

Embodiment 3

The embodiment mainly introduces to determine at least one target device and/or the target function corresponding to the device control instruction in combination with the acquired information (multi-modal information), determine whether the parameter information in the device control instruction is changed in combination with the acquired information (multi-modal information) to output the changed target parameter information (if not changed, to output the parameter information in the device control instruction), and perform the device control instruction input by the user based on at least one target device and/or the target function and/or target parameter information (changed or unchanged), which is specifically described as follows:

Step S401 (not shown in the figure): acquiring a device control instruction input by the user.

For the embodiment of the present disclosure, the device control instruction input by the user may be input by the user through a text manner, or may be input by the user by using a voice, a button, a gesture, or the like. It is not limited in the embodiment of the present disclosure. The embodiment of the present disclosure is introduced by an example in which a user inputs a device control instruction by voice.

Step S402 (not shown in the figure): acquiring at least one of the following information: user information, environment information, and device information.

For the embodiment of the present disclosure, the user profile database and the user authority database may be preset, as shown in FIG. 2A, wherein the user profile database stores user profile information, including: gender, age, user group, nickname, voice recognition template, and face recognition template and other data, wherein the user group may be divided into four user groups, namely, a host user group, a child user group, an elderly user group, and a guest user group. Wherein, the user profile data of the host user group, the child user group, and the elderly user group may be written at the time of registration, and the user profile data of the guest user group may be written at the time of registration or at the time of use; the user authority database records the categories of the device that may be used by the host user group, the child user group, the elderly user group, and the guest user group and a list of functions that each device may use. For a child user group, the intents A, B, C, D and E may not be allowed, and the intent F is allowed to be performed; for the elderly user group, intents A, B are not allowed to be performed, and intents C, D, E, F are allowed to be performed; for the guest user group, intents B, D, E are not allowed to be performed, intents A, C, F are allowed to be performed; for the host user group, the intents A, B, C, D, E, and F are all allowed to be performed, which the function list has default settings and may also be set manually, such as manually set by the user group user.

For the embodiment of the present disclosure, user information is acquired by voiceprint recognition and/or image recognition. In the embodiment of the present disclosure, after acquiring the device control instruction input by the user by using the voice, the sound processing module determines at least one of the identity information, the gender information, the age information of the user inputting the device control instruction based on the voiceprint recognition; if an image collecting apparatus is provided on some devices, the image processing module determines at least one of the identity information, the gender information, the age information and the user group information of the user inputting the device control instruction based on the face image information of the user inputting the device control instruction collected by the image collecting apparatus through the face image recognition technology. Specifically, when the corresponding sound signal and the face image signal are collected, the identity authentication may use the face authentication information to compare and authenticate with the user face recognition template of each user in the user profile database to determine the user identity. When only the sound signal, rather than the face image signal, is collected, the identity authentication uses the voiceprint authentication information to compare and authenticate with the user's voiceprint recognition template in the user profile database to determine the user identity (considering that in the scenario of smart home, a camera is often installed on a computer or a TV, when the speaker is in kitchen and bedroom, an image signal may not exist).

When the authentication is passed (i.e., the speaker's feature has a high degree of similarity to a user's voiceprint recognition template (or face recognition template) in the existing user profile database), the user profile of the user in the user database is output, including gender, age, user group, etc.; if the identity authentication fails, it means a new user, then creating and writing new user profile data, writing the acquired gender data, age data, etc., and the user group may be set as a guest. Then newly created user profile data is output, including gender, age, user group, etc., then the user authority of the corresponding user group in the user authority database is queried and output according to the output user group in the user profile data. The user authority output and user profile information are integrated into the multi-modal information, and at least one target device and/or device control instruction corresponding to the device control instruction is determined based on the integrated multi-modal information and the device control instruction input by the user, as in Step S403.

For the embodiment of the present disclosure, a Markov random domain, a convolutional neural network, or the like may be used to perform voiceprint recognition on a device control instruction input by voice to determine at least one of identity information, gender information, and age information of the user inputting the device control instruction. Taking the neural network method as an example, after training the voiceprint classification network with a large amount of data, the network is used to extract the feature vector of the voiceprint and saves the feature vector as a template; comparing the feature of the voiceprint to be authenticated with the cosine distance of each feature template in the database during authentication, if exceeding the threshold, the authentication is successful, otherwise it fails; the convolutional neural network may also be used for voice recognition of age information and/or the gender information, which is not described in the embodiment of the present disclosure.

For the embodiment of the present disclosure, after the device control instruction input by the user by voice is acquired, the sound processing module may first perform sound noise cancellation processing on the device control instruction input by the user. In the embodiment of the present disclosure, the sound noise cancellation technology may include: a multi-mic cooperative noise cancellation technology, and a convolutional neural network noise cancellation technology. This is not described in the embodiment of the present disclosure.

Figure 13:
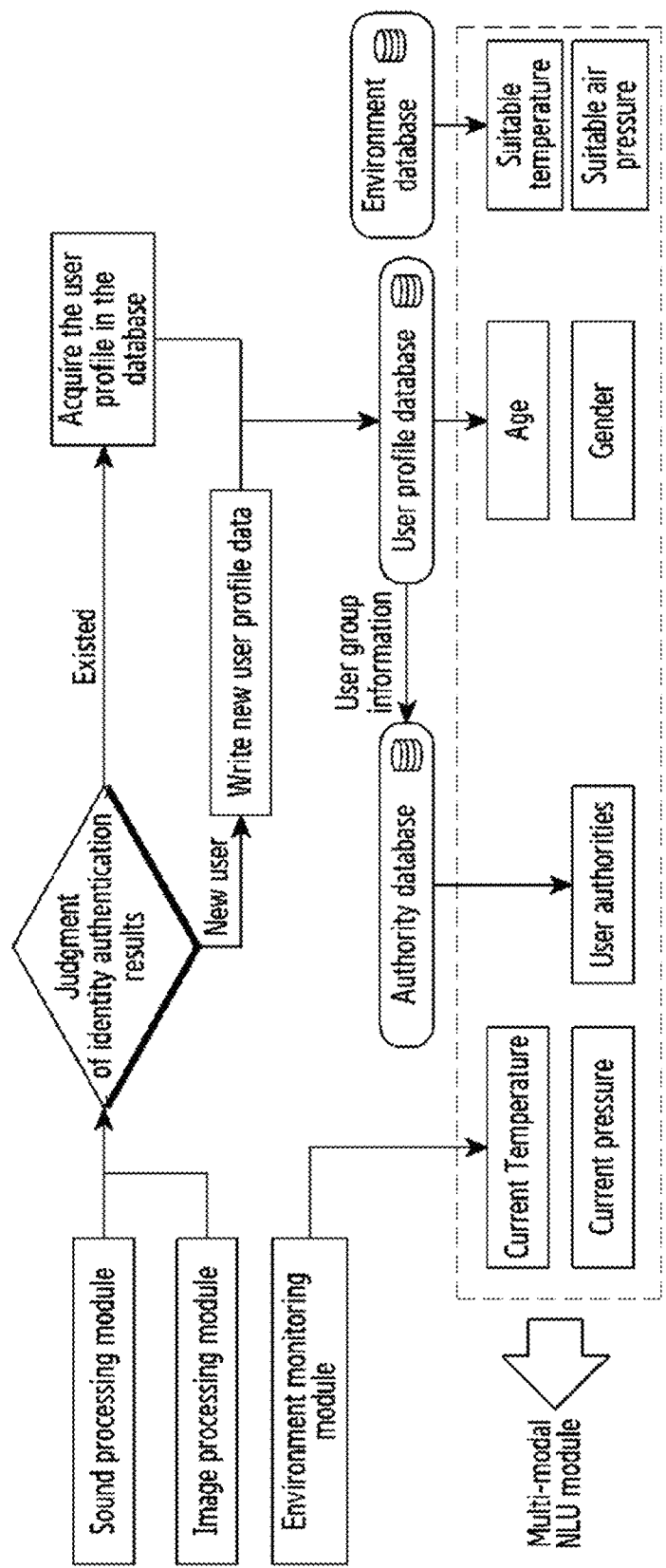
FIG. 13 shows a schematic diagram of acquiring multi-modal information in Embodiment 3 of the present disclosure.

Further, after Step S402, that is, after acquiring the device control instruction input by the user by voice and the face image information, then the identity authentication is performed, and if the authentication is passed, that is, the user is determined to be an existing user according to the identity authentication result, then the user profile information (including: age, gender, user group, etc.) is acquired from the created user profile database, and the user authority is acquired from the pre-created user authority database based on the user group information; if the identity authentication fails, that is it is judged as a new user according to the identity authentication result, the user profile is obtained based on the device control instruction input by the user by voice and the face image information, and stored in the user profile database, that is, the new user image data is written; and the environment information (current temperature, current air pressure, etc.) is acquired through the environment monitoring module, and suitable environment information (suitable temperature, suitable air pressure, etc.) is obtained from preset environment data. In addition, the device information may be acquired, and the multi-modal information may be composed according to the above information, as shown in FIG. 13.

Figure 14:
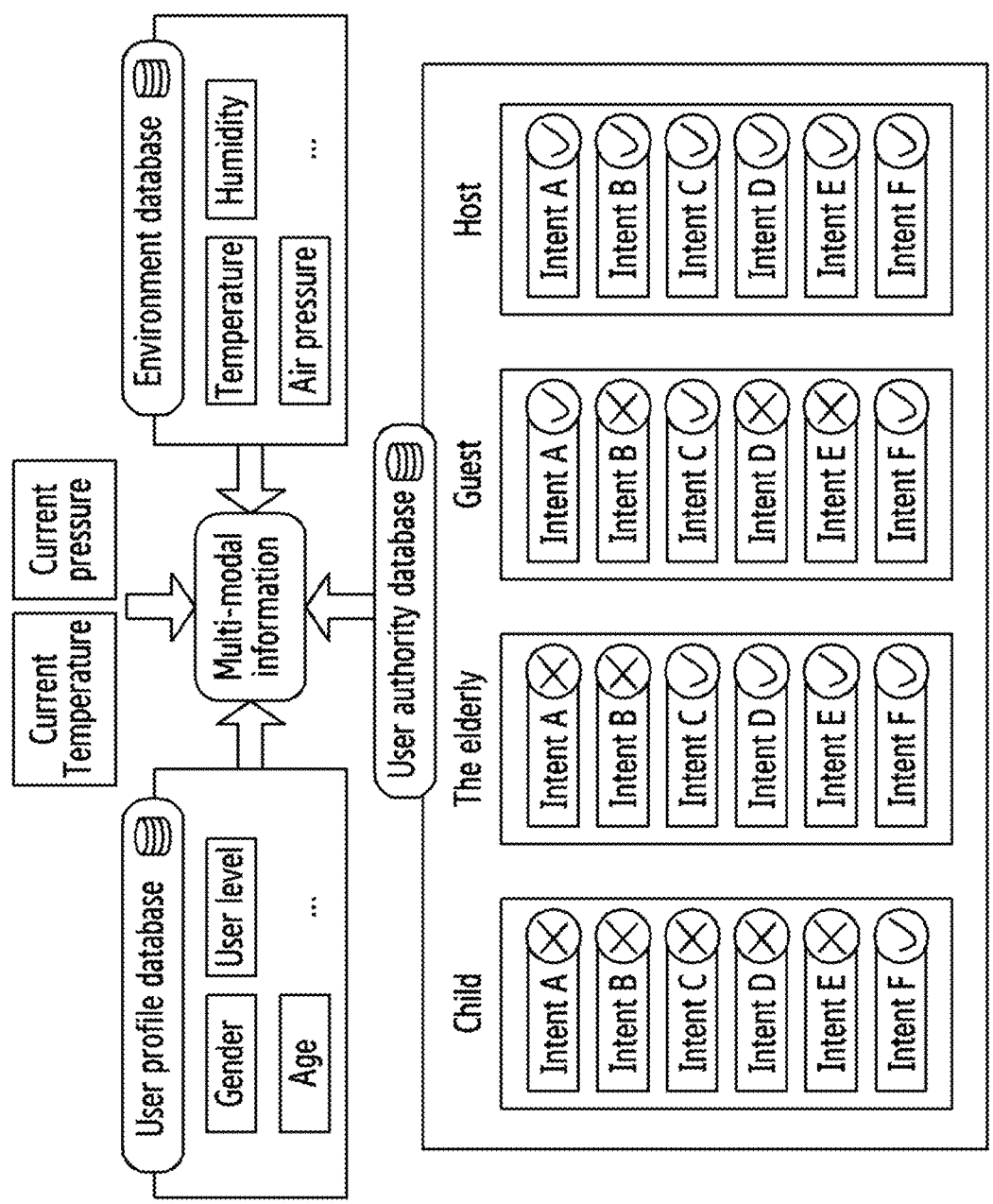
FIG. 14 shows a schematic diagram of determining multi-modal information based on a user profile database, an environment database, and a user authority database according to Embodiment 3 of the present disclosure.

In the embodiment of the present disclosure, as shown in FIG. 14, the multi-modal information includes: environment information (including current temperature, current air pressure, etc.), information obtained from the user profile database (including gender, user level (user group)), age, etc.), information obtained from the environment database (including suitable temperature, suitable humidity, suitable pressure, etc.) and information acquired from the user authority database. For example, the user authority database records the categories of the device that may be used by the host user group, the child user group, the elderly user group, and the guest user group and a list of functions that each device may use. For a child user group, the intents A, B, C, D and E may not be allowed, and the intent F is allowed to be performed; for the elderly user group, intents A, B are not allowed to be performed, and intents C, D, E, F are allowed to be performed; for the guest user group, intents B, D, E are not allowed to be performed, intents A, C, F are allowed to be performed; for the host user group, the intents A, B, C, D, E, and F are all allowed to be performed.

For the embodiment of the present disclosure, Step S401 may be performed before Step S402, or may be performed after Step S402, and may also be performed simultaneously with Step S402. It is not limited in the embodiment of the present disclosure.

Step S403 (not shown in the figure), determining at least one target device corresponding to the device control instruction and/or a target function corresponding to the device control instruction, based on the acquired information and the device control instruction.

For the embodiment of the present disclosure, based on the user group information to which the user inputting the device control instruction belongs, the at least one target device corresponding to the device control instruction and/or the target function corresponding to the device control instruction may be determined; the at least one target device corresponding to the device control instruction and/or the target function corresponding to the device control instruction may be determined according to the age information and/or the gender information of the user inputting the device control instruction; the at least one target device corresponding to the device control instruction and/or the target function corresponding to the device control instruction may be determined based on the user group information to which the user inputting the device control instruction belongs, as well as the age information and/or the gender information of the user inputting the device control instruction.

Certainly, based on the acquired information and the device control instruction, and through the trained model, the at least one target device corresponding to the device control instruction and/or the target function corresponding to the device control instruction may be determined. For example, based on the acquired information (multi-modal information) and the device control instruction, and through the trained domain classifier (DC), the at least one target device corresponding to the device control instruction and/or the target function corresponding to the device control instruction may be determined; and/or based on the acquired information (multi-modal information) and the device control instruction, the target function corresponding to the device control instruction is determined through the trained intent classifier (IC).

Specifically, in Step S403, the determining at least one target device corresponding to the device control instruction, includes: obtaining the domain classification result by using the domain classifier based on the acquired information and the device control instruction; and if the maximum element value in the domain classification result is not less than a first preset threshold, or otherwise, determining at least one target device corresponding to the device control instruction based on the domain classification result.

For the embodiment of the present disclosure, before obtaining the domain classification result by using the domain classifier based on the acquired information and the device control instruction, the method may further include: training the domain classifier.

Specifically, the training sample is $(s_i, m_i, d_i)$, wherein $s_i$ represents the sentence text of the input data, $m_i$ represents the multi-modal information and includes gender, authority, age and the like of the user inputting the device control instruction, $d_i$ represent the tag of the sentence, that is, the domain to which it belongs (i.e., which device it belongs to), i represents the index of one piece of training data in the training data set, $d_i$ is a one-hot encoding form, that is, when the sentence belongs to the j-th device, $d_{ij}$ is 1, and $d_{ik}$ ($k \neq j$) is 0; if the sentence is an override sentence (for example, an 4-year-old user's instruction sentence is "give me bake a sweet potato," while the oven is not allowed for use by children), all elements of $d_i$ are 0, and the loss function on which the training is based is as follows:

$$Loss = -\sum_{j=0}^{M}\sum_{i=0}^{N} d_{ij} \log \hat{d}_{ij} - \sum_{j=0}^{M}\sum_{i=0}^{N}(1-d_{ij})\log(1-\hat{d}_{ij});$$

wherein, $\hat{d}_{ij}$ is the predicted output of the model, and loss is 0 when the predicted output is exactly the same as $d_{ij}$.

When based on the above training method, after training the domain classifier, the domain classification result is obtained based on the acquired information and the device control instructions, and by using the trained domain classifier. Specifically, the input data is (s, m), wherein s is the text information corresponding to the device control instruction and m is the multi-modal information, and the predicted output $\hat{d}$ (domain classification results) may be obtained by using the trained DC model; $\hat{d}_k$ is the largest element in $\hat{d}$, and if $\hat{d}_k \geq c$ (c is the first preset threshold and may be 0.5), then the sentence is classified as the k-th device, and if $\hat{d}_k < c$, it indicates that the execution probability of all devices is less than the first preset threshold, indicating that the sentence belongs to the protected case, which accordingly the device control instruction may be rejected to perform (for example, an 4-year-old user's instruction sentence is "give me bake a sweet potato," while the oven is not allowed for use by the child), wherein all the elements of the sentence tag are 0 during training, and accordingly when predicting by the trained model, the output predicted by the sentence is close to 0 and may be less than the threshold c, thereby resulting in that DC may not give classification and may reject to perform.

Specifically, as shown in FIG. 2B, the input text may be a device control instruction in a text format input by the user, and may also be a device control instruction converted from the device control instruction in voice format input by the user through the voice-text conversion, and the text is subjected to the word encoding (word vector conversion and position encoding) to obtain the encoding vector, then after subjecting to the convolutional neural network and the self-attention model, the text expression vector is obtained. Wherein, the text after converted by the word vector is (w1, w2, w3 . . . ), wherein w1, w2, w3 represents the word vector corresponding to each word in the sentence (device control instruction); the position encoding is a function (f(1), f(2), f(3)) and is a function of the position index of the word vector, the two parts are added to obtain the encoding vector (w1+f(1), w2+f(2), w3+f(3) . . . ), which then the obtained encoding vector is subjected the convolutional neural network and self-attention model to obtain a text expression vector, and then the multi-modal information representation vector and the text expression vector are connected to obtain a joint vector (such as a vector (a1, a2, a3 . . . ), a vector (b1, b2, b3 . . . ), and a vector (a1, a2, a3 . . . , b1, b2, b3, . . . ) after connected); then the joint vector is input into the full connection layer to output the classification result (the execution probability of device A, the execution probability of device B, and the execution probability of device C).

Further, a manner of converting the multi-modal information (acquired information) into an information representation vector corresponding to the multi-modal information is introduced. Specifically, after acquiring at least one of user information, environment information and device information, the method further includes: converting discrete information in the acquired information into a continuous dense vector; determining an information representation vector (multi-modal information representation vector) corresponding to the acquired information according to the converted continuous dense vector and the continuous information in the acquired information.

For the embodiment of the present disclosure, the discrete information in the acquired information may be converted into a continuous dense vector by a transform matrix. In the embodiment of the present disclosure, a continuous dense vector is obtained by conversion by the transform matrix; the converted continuous dense vector and the information in the acquired information which does not belong to the discrete value are connected to obtain a joint vector, and then the joint vector is performed with a preset processing to obtain an information representation vector corresponding to the acquired information.

Figure 15:
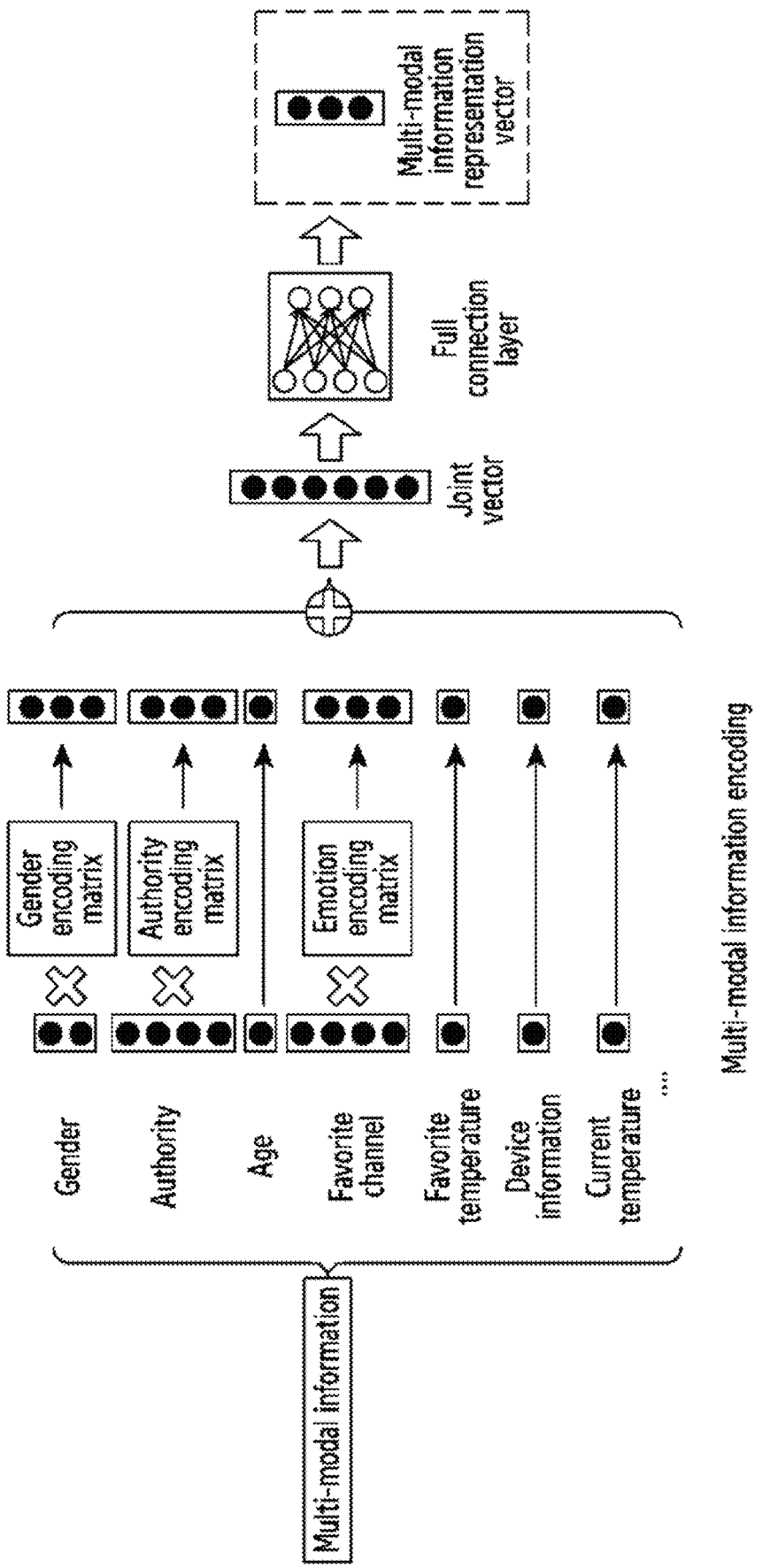
FIG. 15 shows a schematic diagram of obtaining an information representation vector (a multi-modal information vector) corresponding to the acquired information by the acquired information (multi-modal information) according to Embodiment 3 of the present disclosure.

Specifically, as shown in FIG. 15, when performing the multi-modal information encoding on the acquired information (multi-modal information), for example, gender, authority, and favorite channels are, as discrete values, required to be converted into a continuous dense vector by an encoding matrix, and, age, favorite temperature, device information and the current temperature, etc. may be directly input; the encoded multi-modal information is connected to obtain the joint vector, which then is subjected to a full connection layer and a sigmoid activation function to obtain the information representation vector (multi-modal information representation vector) corresponding to the acquired information. For example, the information corresponding to the gender is processed by the gender encoding matrix to obtain a continuous dense vector corresponding to the gender information; the device control authority information of the user is processed by the authority encoding matrix to obtain a continuous dense vector corresponding to the authority information; the favorite channel is processed by an emotion encoding matrix to obtain a continuous dense vector corresponding to the favorite channel.

The controlling at least one target device to perform a corresponding operation based on the acquired information and the device control instruction, includes:

controlling at least one target device to perform a corresponding operation based on the information representation vector corresponding to the acquired information and the device control instruction.

Therefore, the difference between the DC model and the existing DC model is that multi-modal information is added as an input, such that the model may perform domain classification (determining at least one target device) with reference to the user information and/or environment information and/or device information. For example, when the temperature of the oven is too high, the user inputs "bake cake for one hour", and the domain classifier will not classify the sentence into the oven domain, but will reject to perform.

For the embodiment of the present disclosure, when the at least one target device is determined based on the acquired information and the device control instruction, the target function corresponding to the device control instruction may be determined based on the acquired information and the device control instruction and by using the intent classifier; when the at least one target device is determined based on the acquired information and the device control instruction, the target function corresponding to the device control instruction is respectively determined based on the acquired information and the device control instruction, and by the intent classifiers respectively corresponding to the respective target devices in at least one target device. The details are as follows:

In Step S403, determining the target function corresponding to the device control instruction, includes: performing intent classification processing based on the acquired information and the device control instruction to determine an execution probability of each control function; outputting the operation result of rejecting to execute the device control instruction if the execution probability of each control function is less than a second preset threshold, or otherwise, determining the target function corresponding to the device control instruction based on the execution probability of each control function.

Specifically, the intent classification processing is performed by a model (intent classifier) based on the acquired information and the device control instruction. In the embodiment of the present disclosure, when multiple target devices are determined, the intent classification may be performed only by one model, and the intent classification may also be performed by using models in the respective target devices.

Further, since the intent classification processing may be performed by the model (intent classifier), then before performing intent classification processing by the model (intent classifier) based on the acquired information and the device control instruction, further including: training a model (intent classifier), the specific manner is shown as follows: training a model (intent classifier) by the following loss function:

$$\text{Loss} = -\sum_{j=0}^{M}\sum_{i=0}^{N} I_{ij} \log \hat{I}_{ij} - \sum_{j=0}^{M}\sum_{i=0}^{N}(1-I_{ij})\log(1-\hat{I}_{ij});$$

Wherein $\hat{I}_{ij}$ is the predicted output of the model, and $I_i$ is the tag of the i-th training data and is in the one-hot encoding form, that is, when the sentence belongs to the j-th function (target function), $I_{ij}$ is 1, $I_{ik}$ (k≠j) is 0. If the training sentence is an override sentence (for example, the instruction sentence of the user of age 4 is "uninstall XXAPP on the TV", however the function for uninstall app on the TV is unavailable for the child even if the TV is open to the child), and then all elements of $I_i$ are 0.

Wherein, when training the intent classifier, the training sample still contains the acquired information (multi-modal information), and the multi-modal information may be initialized by the multi-modal information in the trained domain classifier, to speed up the training.

For the embodiment of the present disclosure, after the intent classifier is trained by the above manner, the target function corresponding to the device control instruction may be determined based on the device control instruction input by the user and the acquired information, and through the trained intent classifier. The manner for specifically determining the target function corresponding to the device control instruction is as follows:

The input of the intent classifier is (s, m), wherein s is the text information corresponding to the device control instruction, and m is the multi-modal information. First, the domain (device) is obtained through the DC model, and then the IC model trained by the domain is used, such that the predicted output $\hat{I}$ may be obtained, and $\hat{I}_k$ is the largest element in the $\hat{I}$. If $\hat{I}_k \geq c$ (c is the set threshold, and may be 0.5), then the classification result of the device control instruction is the k-th function (target function), and if $\hat{d}_k < c$, it indicates that the device control instruction belongs to the protected case and will be rejected to execute. Meanwhile, if the host sets the authorities of the child, the elderly, the guest, etc. in the user authority database, and the k-th function is just in the mask list, then it will be rejected to execute. As shown in FIG. 4, the device control instruction input by the user includes: intent A, intent D, or intent F. If the host does not set the user authority, the intent classifier directly outputs intent A, intent D, or intent F; if the host sets the user authority (intent A, intent C and intent F are allowed to be operated, but intent B, intent D, and intent E are not allowed to be operated), then the intent classifier directly outputs intent A and intent F, and rejects to execute intent D.

For example, if the child says "delete the channel list of the TV", the device control instruction will be assigned to the TV domain by the domain classifier, but the function of deleting the channel list of the TV is not open to the child. Since all elements of the tag of this sentence are 0 during training, the predicted output of the device control instruction is close to 0 or may be close to the threshold c when predicting by the trained intent classifier, so that the intent classifier may not give an intent classification and the target function will be rejected to execute.

Further, based on the acquired information and the device control instruction, and through the intent classifier, the multi-modal information input to the intent classifier when determining the target function is its corresponding representation vector. In the embodiment of the present disclosure, the manner of acquiring the information representation vector corresponding to the acquired information from the acquired information refers to the foregoing embodiment in detail which will not be described herein again.

It should be noted that if the target device corresponding to the device control instruction is not determined based on the acquired information and the device control instruction (directly outputting an instruction of rejecting to execute the corresponding operation), the target function corresponding to the device control instruction may not be determined, and the device control instruction is not tagged.

Step S404 (not shown in the figure): performing tag processing on the device control instruction to obtain target parameter information based on the acquired information.

For the embodiment of the present disclosure, Step S304 may specifically include Step S3041 (not shown in the figure), wherein, Step S3041: obtaining the target parameter information based on the acquired information and the device control instruction and through the slot tagger.

Wherein, the target parameter information includes any one of the following: the parameter information after the parameter information in the device control instruction is changed by the slot tagger and the parameter information in the device control instruction.

For the embodiment of the present disclosure, if the device control instruction satisfies the preset condition, the target parameter information is the parameter information after the parameter information in the device control instruction is changed by the slot tagger; if the device control instruction does not satisfy the preset condition, the target parameter information is the parameter information in the device control instruction.

Wherein, the preset condition includes at least one of the following:
the parameter value is not contained in the device control instruction;
the parameter value contained in the device control instruction does not belong to the parameter value in the parameter value range determined by the acquired information.

Further, Step S4041 may specifically include: Step S40411 (not shown in the figure), Step 430412 (not shown in the figure), Step 430413 (not shown in the figure), Step S40414 (not shown in the figure), and Step S40415 (not shown in the figure), wherein, Step S40411: performing slot tag processing on the device control instruction to obtain the parameter information in the device instruction.

Step S40412: determining whether to change the parameter information in the device control instruction based on the device control instruction and the acquired information.

Specifically, Step S40412 may include: obtaining the logistic regression result by logistic regression processing based on the parameter information in the device control instruction and the acquired information; determining whether to change the parameter information in the device control instruction based on the logistic regression result.

Step S30413: if changed, determining the changed target parameter information based on the parameter information in the device control instruction and the acquired information.

Specifically, in Step S30413, the determining the changed target parameter information based on the parameter information in the device control instruction and the acquired information may include: obtaining the linear regression result based on the parameter information in the device control instruction and the acquired information by linear regression processing; determining the changed parameter information based on the linear regression result.

For the embodiment of the present disclosure, if the parameter information in the device control instruction needs to be changed, the output result of the slot tagger includes the changed parameter information, and may also include: the indication information corresponding to the changed parameter information, and parameter information in the device control instruction.

For the embodiment of the present disclosure, if the parameter information in the device control instruction does not need to be changed, the output result of the slot tagger includes: the indication information corresponding to the unchanged parameter information, and parameter information in the device control instruction.

For steps S40411-S40413, as shown in FIG. 11, the specific process of performing slot tag processing by the slot tagger is introduced: the structure of the encode and the decoder, wherein $x1, x2 \ldots xm$ are the user's device control instructions, and the encoding layer also uses a combination of word vector conversion and position encoding, which each word is represented as a vector of a fixed dimension after encoding; the LSTM layer is used to encode, the features $h1, h2 \ldots hm$ of each word are extracted; $y1, y2 \ldots yk$ are the taggers corresponding to $x1, x2 \ldots xm$ (it may use the BMO tag, wherein B means that the vocabulary is the starting position of the parameter, M means that the vocabulary is the middle position or ending position of the parameter, and O means that the vocabulary is not a parameter), and $y1, y2 \ldots yk$ are represented as the hidden state C by the LSTM layer; C and $h1, h2 \ldots hm$ are used to calculate the vector d through the attention layer, d is subjected to the MLP to obtain the vector f, and f is subjected to the MLP to output the tag $yk+1$ of the next moment (parameter information in the device control instruction). At the same time, the vector f and the multi-modal information representation vector are subjected to logistic regression and linear regression to obtain the logistic regression result and the linear regression result, respectively.

Wherein, the logistic regression result determines whether the parameter is changed at the moment $k+1$, and the linear regression result determines the changed value.

For the embodiment of the present disclosure, the logistic regression result determines whether the parameter is changed, and the linear regression result determines the changed value, such that the network has an ability to rewrite the parameter.

For example, the device control instruction input by the user is "set the air conditioner to 100 degrees centigrade", the instruction is classified into the air conditioner domain by the domain classifier, and the intent classifier is assigned to the intent of "setting air conditioner temperature"; the ST model labels "100 degrees centigrade" as the parameter to be transferred to the air conditioner, since the air temperature cannot be set by 100 degrees centigrade, the device control instruction cannot be executed. However, after the parameter is tagged by the slot tagger model in the embodiment of the present disclosure, 100 degrees centigrade is rewritten as the upper limit temperature of the air conditioner in the environment database by the logistic regression and linear regression (or changed to a user preferred temperature in the user profile database). Then the parameter is transferred to the air conditioner for execution, thereby increasing the indoor temperature and be more in line with the semantics of "setting the air conditioner to 100 degrees centigrade". For another example, the user sentence is "turn the oven up to 240 degrees centigrade", and it is monitored that the current oven has a higher operating temperature and a longer working time, and the information is transferred to the multi-modal information representation vector; the ST tagging model tags the parameter as 240 degrees centigrade, and the parameter is rewritten in combination with the multi-modal information representation vector to output 200 degrees centigrade for the oven to execute.

Further, before obtaining the target parameter information based on the acquired information and the device control instruction and through the slot tagger, the method further includes: acquiring a plurality of training data; and training the slot tagger based on the acquired training data and by the target loss function.

Wherein, any of the training data comprising the following information:
the device control information, slot tag result corresponding to the device control instruction, the information indicating whether the parameter in the device control instruction has been changed, the changed parameter information, the acquired information.

Further, before training the slot tagger based on the acquired training data and through a target loss function, the method further includes: determining the target loss function.

Wherein, the determining the target loss function includes: determining a first loss function based on the slot tagging result corresponding to the device control instruction in each training data and the predicted tagging result of the slot tagger; determining a second loss function based on the information indicating whether the parameter in the device instruction in each training data has been changed and the information indicating whether changed predicted by the slot tagger; determining a third loss function based on the changed parameter information in each training data and the changed parameter information output by the slot tagger; and determining the target loss function based on the first loss function, the second loss function, and the third loss function.

Specifically, the training data set used for training the slot tagger may be ($s_i$, $y_i$, $c_i$, $v_i$, $m_i$), wherein $s_i$ represents the text information corresponding to the input device control instruction, $y_i$ represents the BMO tag corresponding to the device control instruction (for example, $S_i$ is "set the air conditioner to 30 degrees centigrade", and $y_i$ is "O O O O B M"), $c_i$ is 0 or 1 (0 means that there is no parameter to be changed, and 1 means the parameter needs to be changed), $v_i$ means the changed padding value (the changed parameter information), $m_i$ represents the multi-modal information (acquired information) (including a current sensor measurement, an appropriate value and an executable range of the device, etc.), and i is the index of each piece of data in the training data set.

Further, the trained loss function is:

$$Loss = -\sum_{j=0}^{M}\sum_{i=0}^{N} y_{ij} \log \hat{y}_{ij} - \alpha \sum_{i=0}^{N} c_i \log c\, \hat{c}_1 - \beta \sum_{i=0}^{N} (v_i - \hat{v}_1)^2$$

Wherein, the first item in Loss indicates the tagging error, $y_{ij}$ indicates the BMO tag of the j-th word of the i-th training data, $\hat{y}_{ij}$ is the BMO result of the j-th word of the i-th training data predicted by the model; the second term in Loss is the parameter correction error, $c_i$ indicates whether the parameter needs to be changed, $c_i=0$ indicates that the parameter does not need to be changed, and $c_i=1$ indicates that the parameter needs to be changed; the third item in Loss is the square of the difference between the changed value $\hat{v}_i$ output by the model and the tag modification value $v_i$.

Step S405$a$ (not shown in the figure): controlling at least one target device to perform the corresponding operation based on the at least one target device and/or the target function and/or the target parameter information.

For the embodiment of the present disclosure, if at least one the target device and/or the target function corresponding to the device control instruction is determined in Step S403, and the target parameter information is output in Step S404, the at least one target device is controlled to perform a corresponding operation.

Step S405$b$ (not shown in the figure): outputting an operation result of rejecting to execute the device control instruction based on the acquired information and the device control instruction.

For the embodiment of the present disclosure, when it is determined by Step S403 that the device control instruction input by the user cannot be executed, the device control instruction input by the user is not executed, and an instruction of rejecting to execute the corresponding operation may be output.

Specifically, outputting an operation result of rejecting to execute the device control instruction, includes: outputting the operation result of rejecting to execute the device control instruction, when determining that at least one of the following is satisfied according to the acquired information:
the user possessing no control authority for the at least one target device; the user possessing no control authority for a target function corresponding to the device control instruction; the at least one target device possessing no execution condition corresponding to the device control instruction; and a working environment of the at least one target device possessing no execution condition corresponding to the device control instruction.

For the above conditions, an example of outputting the operation result of rejecting to execute the device control instruction is shown in Embodiment 1, and details are not described herein again.

Figure 16:
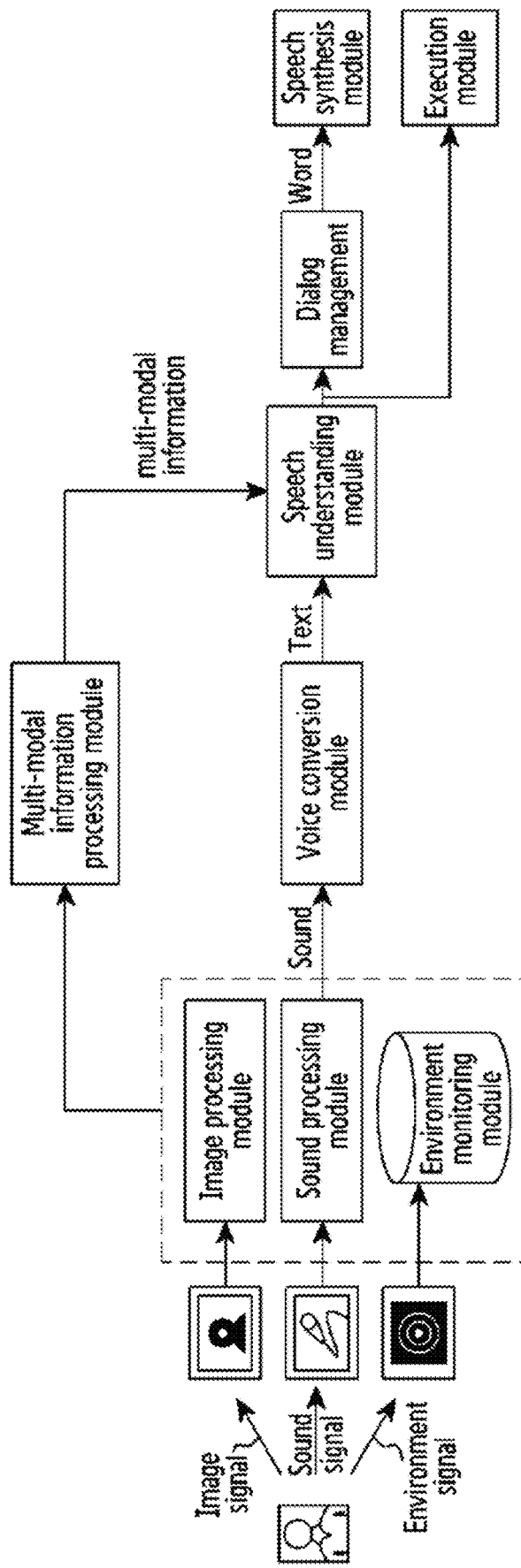
FIG. 16 shows a schematic structural diagram of a device control system in Embodiment 3 of the present disclosure.

Further, a device control system is introduced for Embodiment 3 (taking that the user inputs the device control instruction by voice as an example), wherein the user's voice signal, image signal and environment signal (such as indoor air quality, etc.) are collected to finally constitute a semantic understanding of the user, give voice feedback and execute the corresponding instructions. In FIG. 16, the system is divided into a sound processing module, an image processing module, an environment monitoring module, a multi-modal information processing module, a speech conversion module, a semantic understanding module, a dialog management module, a speech synthesis module, and an execution module. The main improvement of the embodiment of the present disclosure is in the multi-modal information processing module and the semantic understanding module. Wherein, after the audio collecting apparatus (microphone) collects the sound signal, the sound processing module performs noise cancellation and identity recognition, and outputs the sound signal and the identity authentication information after the noise cancellation processing. After the image collecting apparatus (camera) captures the face image information, the image processing module performs face extraction and face recognition, and outputs identity authentication information. The sensor collects the environment information including temperature, humidity and the like. The identity authentication information, the environment information and the like output by the image processing module, the sound processing module, and the environment monitoring module is integrated into the multi-modal information through the multi-modal information processing module; the sound signal output by the sound processing module is converted into text by the speech conversion module; both the text and the multi-modal information is input to the semantic understanding module, and the semantic understanding module outputs the domain, the intent and the tagger of the sentence to the dialog management module and the execution module; the dialog management module generates a reply text which will be synthesized by the speech synthesis module to give a reply; the corresponding operation is performed by the execution module.

Based on the foregoing device control method, the hardware device in this embodiment of the present disclosure may be implemented by the following manners:

A. Monolithic type: relying on a smart device such as a smart speaker and smart TV as hardware foundation. The image processing module, the sound processing module, the speech conversion module, the semantic understanding module, the dialog understanding module, the speech synthesis module, and the like are all implemented on the smart hardware, and the user needs to issue an instruction to the smart hardware.

B. Distributed type: all smart devices save their own IC models respectively, and a common DC model. According to whether the smart device is provided with a microphone and a camera, the devices respectively saves the image processing module, the sound processing module, and the speech conversion module, and the smart devices are able to communicate with each other, and a user may issue an instruction to any device.

C. Communication type: image processing module, sound processing module, speech conversion module, semantic understanding module, dialog understanding module, speech synthesis module, etc. are all stored in a remote server (i.e., in cloud), the user's smart home device acquires sound and image through the audio collecting device (microphone) and the image collecting device (camera), and the server side understands and returns the result.

The flow of the TTS module is described in detail below.

The TTS module in the embodiment of the present disclosure may generate an emotional speech for the reply text, for example, speeches with different intonations, different speech speeds, and/or different volume may be obtained, and the process may be referred to as an Emotional TTS.

Figure 20A:
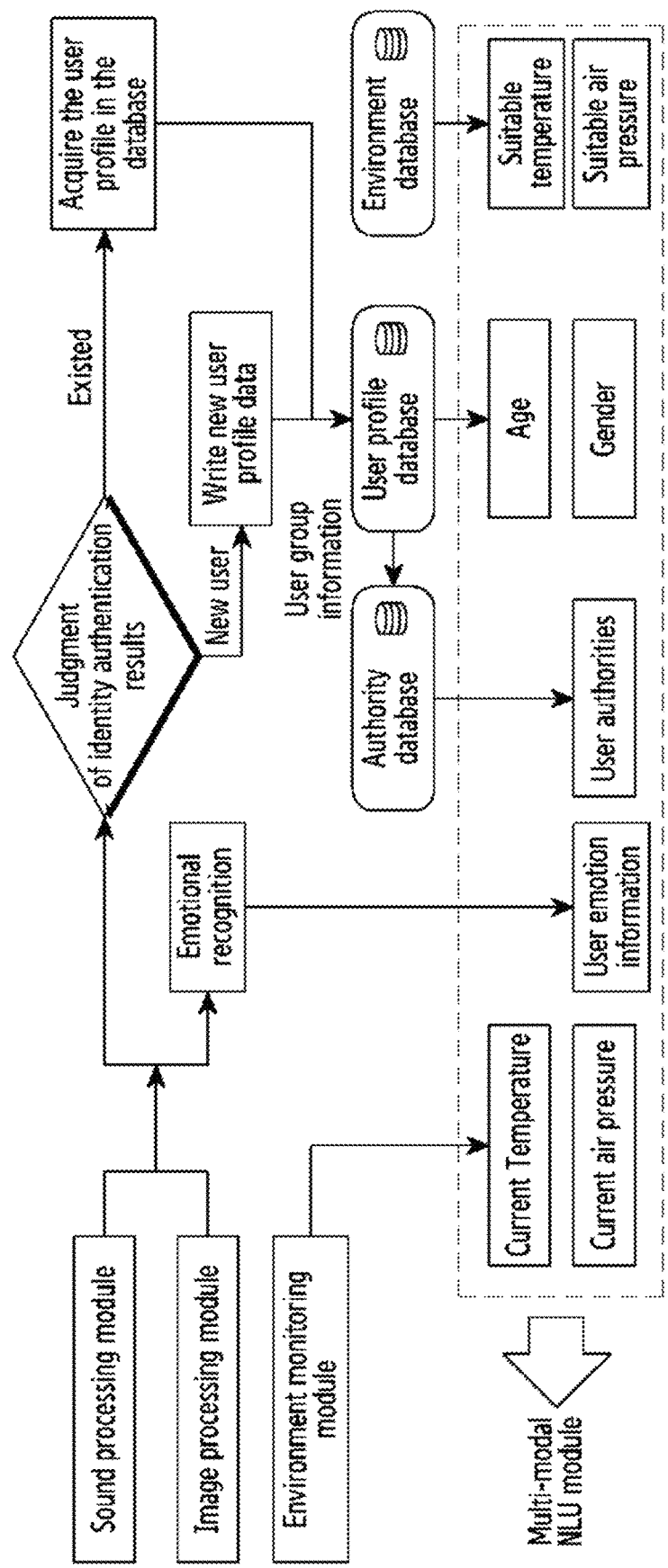
FIG. 20A shows a schematic diagram of acquiring multi-modal information in an embodiment of the present disclosure.

The acquired multi-modal information may be used to perform the Emotional TTS in the embodiment of the present disclosure. Further, the Emotional TTS may be performed by using user information (for example, user age, gender, identity information, etc.) in the multi-modal information. In addition, the embodiment of the present disclosure further provides that the user information may include user's emotional information, in addition to the user profile (for example, age, gender, etc.), the user authority (for example, the user's authority for controlling device), and the following specifically explains how to obtain the user's emotional information:

The processing result of the sound processing module and the processing result of the image processing module are subjected to emotional recognition processing to obtain user emotional information corresponding to the input user. The obtained user's emotional information may be used as user information in the multi-modal information. When the multi-modal fusion processing is performed, the user's emotional information may be fused, as shown in FIG. 20A. Specifically, an emotional recognition process is performed on the processing result of the sound processing module and the processing result of the image processing module to obtain the user's emotional information; the identity authentication uses the face authentication information output by the image processing module to compare and authenticate with the user face recognition template of each user in the user profile database and determines the identity of the user; if the authentication is passed, that is, the user is determined to be an existing user according to the identity authentication result, the user profile (including gender, age, user group, etc.) of the user in the user profile database is obtained and outputted; if the identity authentication fails, that is, it is determined as a new user according to the identity authentication result, new user profile data is created and written in the user profile database, the gender and age data obtained by the sound processing module and the image processing module are written, and the newly created user profile data (including gender, age, user group, etc.) is output; according to the output user group in the user profile data, the user authority of the corresponding user group is queried in the authority database and then is output; the environment information (current temperature, current air pressure, etc.) is acquired through the environment monitoring module, and suitable environment information (suitable temperature, suitable air pressure, etc.) is obtained from preset environment data; the acquired environmental information and user's emotional information, user authority information, and user profiled data are integrated into the multi-modal information, and the multi-modal information is output to the multi-modal NLU module.

In the embodiment of the present disclosure, the user information (for example, user emotional information, user identity information, user age information, user gender information, etc.) in the multi-modal information may be used to perform the Emotional TTS, thereby outputting different emotional speeches for different users or outputting different emotional speeches for different states of the same user.

The embodiment of the present disclosure proposes that the neural network of the Emotional TTS may be pre-trained, and then the online Emotional TTS processing is performed by using the neural network to obtain and output different emotional speeches for different users or different emotional speeches for different states of the same user.

FIG. 20B illustrates the schematic flowchart of training the neural network of the Emotional TTS. First, a combination of all text samples is used as the input of the network training, and a combination of respective emotional speech samples corresponding to the text samples is used as the output of the network training, to train and obtain an initial neural network of the Emotional TTS, wherein the initial neural network may obtain a more neutral emotional representation and the emotional information is not rich enough. Then, the text samples and an emotional code are used as the input of the network training, and the respective emotional speech samples corresponding to the text samples are used as the output of the network training, and the neural network is trained again, so that the neural network with better performance can be obtained.

More specifically, the database stores the text samples and the corresponding emotional speech samples, and also stores a one-hot code of emotion category. When training the neural network, the text samples are preprocessed to extract features of the text samples, for example, full label features, and corresponding audio features (also referred to as acoustic features) are extracted for the emotional speech samples. The one-hot code of the emotion category in the database is processed by a coding matrix, and the embedded emotional code, i.e., "emotional code" in the figure, may be obtained. By using the features of the emotional code and the text samples, input features may be obtained, for example, input features may be obtained by directly connection. According to the obtained input features and the acoustic features obtained by the preprocessing, a Bi-directional Long Short-Term Memory (Bi-LSTM) network is trained such that the output acoustic features approximate to the acoustic features corresponding to the emotional speech samples.

FIG. 20C illustrates a schematic diagram of an online process of the neural network of the Emotional TTS, an emotional category which is desired to reply to the user (which may be referred to as a desired emotional category, i.e., an emotional category corresponding to a reply voice from the device that the user desires to receive) may be determined from the obtained multi-modal information, wherein the desired emotional category may be related to the user information, for example, related to the user's age, gender, user emotional information, etc., and the user's desired emotional category may be obtained by the multi-modal information including the user information. After the reply character (i.e, the reply text, which may be simplified as text) is generated by the DM module of the device, the feature of the text is extracted, and the input feature may be obtained according to the feature of the text and the emotional code corresponding to the user's desired emotional category (for example, the input feature may be obtained by directly connecting the feature of the text and the emotional code corresponding to the user's desired emotional category); the input feature is input to the trained Bi-LSTM network, and the Bi-LSTM network outputs the acoustic feature corresponding to the reply text, and then a vocoder generates a speech corresponding to the reply text based on the acoustic features (corresponding to the generating speech in FIG. 20C).

The above TTS module in the embodiment of the present disclosure may generate emotional speeches for a reply text, for example, voices with different intonations, different speech speeds, and/or different volumes may be obtained, thereby improving the user experience.

The foregoing are some specific implementations of the device control method provided by the embodiment of the present disclosure. Based on this, the embodiment of the present disclosure further provides a device control apparatus. Next, the device control apparatus provided by the embodiment of the present disclosure will be introduced from the perspective of functional modularization with reference to the accompanying drawings.

The embodiment of the present disclosure provides a device control apparatus. As shown in FIG. 17, the apparatus 1700 may include a first acquiring module 1701 and a control module 1702, wherein, The first acquiring module 1701 is configured to acquire a device control instruction input by the user and at least one of the following information: user information, environment information, and device information.

The control module 1702 is configured to control at least one target device to perform a corresponding operation based on the information acquired by the first acquiring module 1701 and the device control instruction.

In another possible implementation of the embodiment of the present disclosure, the user information includes user profile information and/or device control authority information of the user; and/or the device information includes working state information of the device; and/or the environment information includes working environment information of the device.

In another possible implementation of the embodiment of the present disclosure, the control module 1702 is specifically configured to output an operation result of rejecting to execute the device control instruction based on the acquired information and the device control instruction.

In another possible implementation of the embodiment of the present disclosure, the control module 1702 is specifically configured to output the operation result of rejecting to execute the device control instruction, when determining that at least one of the following is satisfied according to the acquired information:

the user possessing no control authority for the at least one target device; the user possessing no control authority for a target function corresponding to the device control instruction; the at least one target device not satisfying an execution condition corresponding to the device control instruction; and a working environment of the at least one target device not satisfying an execution condition corresponding to the device control instruction.

In another possible implementation of the embodiment of the present disclosure, the control module includes: a first determining unit and a control unit, wherein, a first determining unit, configured to determine at least one target device corresponding to the device control instruction and/or a target function corresponding to the device control instruction, based on the acquired information and the device control instruction;

the control unit is specifically configured to control at least one target device to perform the corresponding operation based on the at least one target device and/or the target function determined by the first determining unit.

In another possible implementation of the embodiment of the present disclosure, the first determining unit is specifically configured to perform domain classification processing based on the acquired information and the device control instruction to obtain an execution probability of each device; and output the operation result of rejecting to execute the device control instruction if the execution probability of each device is less than a first preset threshold, or otherwise, determine at least one target device corresponding to the device controlling device based on the execution probability of each device.

In another possible implementation of the embodiment of the present disclosure, the first determining unit is specifically configured to perform intent classification processing based on the acquired information and the device control instruction to determine an execution probability of each control function; output the operation result of rejecting to execute the device control instruction if the execution probability of each control function is less than a second preset threshold, or otherwise, determine the target function corresponding to the device control instruction based on the execution probability of each control function.

In another possible implementation of the embodiment of the present disclosure, the control module 1702 is specifically configured to control the at least one target device to perform a corresponding operation according to the target parameter information based on the acquired information.

Wherein the target parameter information is the parameter information after the parameter information in the device control instruction is changed.

In another possible implementation of the embodiment of the present disclosure, the control module 1702 is specifically further configured to control the at least one target device to perform a corresponding operation according to the target parameter information when satisfying at least one of the following:

the device control instruction not containing a parameter value;

the parameter value contained in the device control instruction not belonging to the parameter value in a parameter value range determined by the acquired information.

In another possible implementation of the embodiment of the present disclosure, the control module 1702 includes: a slot tag processing unit, a second determining unit, and a third determining unit, wherein, the slot tag processing unit is configured to perform slot tag processing on the device control instruction to obtain parameter information in the device control instruction;

the second determining unit, configured to determine whether to change the parameter information in the device control instruction based on the parameter information in the device control instruction and the acquired information;

the third determining unit, configured to determine the changed target parameter information based on the parameter information in the device control instruction and the acquired information, when the second determining unit determines to change the parameter information in the device control instruction.

For the embodiment of the present disclosure, the first determining unit, the second determining unit, and the third determining unit may all be the same unit, or may be different units, or any two units may be the same unit. It is not limited in the embodiment of the present disclosure.

In another possible implementation of the embodiment of the present disclosure, the second determining unit is specifically configured to obtain the logistic regression result by logistic regression processing based on the parameter information in the device control instruction and the acquired information; and determine whether to change the parameter information in the device control instruction based on the logistic regression result; and/or, The third determining unit is specifically configured to obtain a linear regression result by linear regression processing based on the parameter information in the device control instruction and the acquired information; and determine the changed parameter information based on the linear regression result.

In another possible implementation of the embodiment of the present disclosure, the apparatus 1700 further includes a second acquiring module and a training module, wherein, the second acquiring module is configured to acquire multiple training data.

For the embodiment of the present disclosure, the first acquiring module and the second acquiring module may be the same acquiring module, and may also be different acquiring modules. It is not limited in the embodiment of the present disclosure.

The training module is configured to train, through a target loss function, a processing model for changing the parameter information in the device control instruction based on the training data acquired by the second acquiring module.

Wherein, any of the training data comprising the following information:

the device control information, the parameter information in the device control information, the information indicating whether the parameter in the device control instruction has been changed, the changed parameter information, the user information, the environment information, and the device information.

In another possible implementation of the embodiment of the present disclosure, the apparatus 1700 further includes a first determining module.

The first determining module is configured to determine a target loss function;

wherein the first determining module includes a fourth determining unit, a fifth determining unit, a sixth determining unit, and a seventh determining unit, wherein, the fourth determining unit is configured to determine a first loss function based on the parameter information in the device control instruction in each training data and the parameter information in the device control instruction predicted by the model;

the fifth determining unit is configured to determine a second loss function based on the information indicating whether the parameter in the device instruction in each training data has been changed and the information indicating whether changed predicted by the model;

the sixth determining unit is configured to determine a third loss function based on the changed parameter information in each training data and the changed parameter information predicted by the model;

the seventh determining unit is configured to determine the target loss function based on the first loss function determined by the fourth determining unit, the second loss function determined by the fifth determining unit, and the third loss function determined by the sixth determining unit.

For the embodiment of the present disclosure, the fourth determining unit, the fifth determining unit, the sixth determining unit, and the seventh determining unit may all be the same determining unit or may be different determining units, any two of them may be the same determining units, and any three of them may be the same determining units. It is not limited in the embodiment of the present disclosure.

In another possible implementation of the embodiment of the present disclosure, the apparatus 1700 further includes a conversion module, and a second determining module, wherein, the conversion module is configured to convert discrete information in the acquired information into a continuous dense vector;

the second determining module is configured to determine an information representation vector corresponding to the acquired information according to the continuous dense vector converted by the conversion module and the continuous information in the acquired information.

For the embodiment of the present disclosure, the first determining module and the second determining module may be the same determining module, and may also be different determining modules. It is not limited in the embodiment of the present disclosure.

The control module 1702 is specifically configured to control at least one target device to perform an operation based on the information representation vector and the device control instruction corresponding to the acquired information determined by the second determining module.

The embodiment of the present disclosure provides a device control apparatus, may control at least one target device to perform a corresponding operation, by acquiring at least one of user information, environment information, and device information and the device control instruction input by the user, based on the acquired information and the device control instruction; as can be seen from the above, compared with the methods for controlling device based solely on the control instruction input by a user in the prior art, the embodiment of the present disclosure considers at least one factor, which may affect operations of the device, of the user information, the device information, and the environment information, in addition to considering the control instruction input by the user when controlling the device, such that the device may operate more safely and flexibly. For example, by acquiring a device control instruction in formats of voice, text, button, gesture, and the like input by the user, as well as considering at least one of the user information, the device information, and the environment information, an operation of the air conditioner is directly controlled to turn on, off, or adjust the temperature, such that it is possible to control the smart device to perform corresponding operations safely and conveniently.

The device control apparatus provided by the embodiment of the present disclosure is applicable to the foregoing method embodiments, and details are not described herein again.

The device control apparatus provided by the embodiment of the present disclosure is introduced in the above from the perspective of function modularization. Next, the electronic device provided by the embodiment of the present disclosure is introduced from the perspective of hardware materialization, and the computing system of the electronic device is introduced at the same time.

The embodiment of the present disclosure provides an electronic device, which is applicable to the foregoing method embodiments, as shown in FIG. 18, including: a processor 1801; and a memory 1802 configured to store machine readable instructions. When the instructions are executed by the processor 1801, the processor 1801 is caused to execute the above device control method.

FIG. 19 shows a schematic block diagram illustrating a computing system that may be used to implement the electronic device of the present disclosure, according to the embodiment of the present disclosure. As shown in FIG. 19, the computing system 1900 includes a processor 1910, a computer readable storage medium 1920, an output interface 1930, and an input interface 1940. The computing system 1900 may perform the method described above with reference to FIG. 1 to implement to control at least one target device to perform a corresponding operation based on the device control instruction input by the user. In particular, the processor 1910 may include, for example, a general-purpose microprocessor, an instruction set processor, and/or a related chipset and/or a special purpose microprocessor (e.g., an application specific integrated circuit (ASIC)), and the like. The processor 1910 may also include an onboard memory for caching purposes. The processor 1910 may be a single processing unit or multiple processing units for performing different actions of the method flow described with reference to FIG. 1.

The computer readable storage medium 1920, for example, may be any medium capable of containing, storing, communicating, propagating or transporting instructions. For example, a readable storage medium may include, but is not limited to, an electronic, magnetic, optical, electromagnetic, infrared, or semiconductor system, apparatus, device, or propagation medium. Specific examples of the readable storage medium include: a magnetic storage device such as a magnetic tape or a hard disk (HDD); an optical storage device such as a compact disk (CD-ROM); a memory such as a random access memory (RAM) or a flash memory; and/or a wired/wireless communication link.

The computer readable storage medium 1920 may include a computer program 1921, which may include codes/computer executable instructions that, when executed by the processor 1910, cause the processor 1910 to perform, for example, the method flow described above in conjunction with FIG. 1 and any variations thereof. The computer program 1921 may be configured to have computer program codes, for example, including a computer program module. For example, in an example embodiment, the codes in computer program 1921 may include one or more program modules, including, for example, module 1921A, module 1921B, . . . . It should be noted that the division manner and number of modules are not fixed, and those skilled in the art may use suitable program modules or program module combinations according to actual conditions. When these program module combinations are executed by the processor 1910, these program module combinations cause that the processor 1910 may perform the method flow such as described above in connection with FIG. 1, and any variations thereof.

In accordance with an embodiment of the present disclosure, the processor 1910 may use the output interface 1930 and the input interface 1940 to perform the method flow described above in connection with FIG. 1 and any variations thereof.

The embodiment of the present disclosure provides an electronic device, may control at least one target device to perform a corresponding operation, by acquiring at least one of user information, environment information, and device information and the device control instruction input by the user, based on the acquired information and the device control instruction; as can be seen from the above, compared with the methods for controlling device based solely on the control instruction input by a user in the prior art, the embodiment of the present disclosure considers at least one factor, which may affect operations of the device, of the user information, the device information, and the environment information, in addition to considering the control instruction input by the user when controlling the device, such that the device may operate more safely and flexibly. For example, by acquiring a device control instruction in formats of voice, text, button, gesture, and the like input by the user, as well as considering at least one of the user information, the device information, and the environment information, an operation of the air conditioner is directly controlled to turn on, off, or adjust the temperature, such that it is possible to control the smart device to perform corresponding operations safely and conveniently.

The electronic device and the computing system of the electronic device provided by the embodiment of the present disclosure is applicable to the foregoing method embodiments, and details are not described herein again.

For the embodiments of the present disclosure, the explanations of the same or similar terms in the various embodiments may be used for reference. For example, the manner for determining whether the parameter information in the user device instruction is changed and/or the changed parameter information in Embodiment 3 may be referred to Embodiment 2 of "based on the parameter information in the device control instruction and the acquired information, the prediction result is obtained by fitting the prediction function, and the preset result may include: at least one of whether to change the parameter information in the device control instruction and changed parameter information. The prediction function may take many forms. Specifically, the fitting prediction function may be a linear function, wherein linear regression processing is performed to obtain a linear regression result when the fitting prediction function is a linear function; the fitting prediction function may also be an exponential function, the logistic regression is performed to obtain a logistic regression result when the fitting prediction function is an exponential function; further, the fitting prediction function may also be a polynomial function, the similar linear regression processing is performed to obtain a similar linear regression result when the fitting prediction function is a polynomial function. In the embodiment of the present disclosure, the prediction function may further include other functions, which is not limited herein."

It should be understood that although the various steps in the flowchart of the drawings are sequentially displayed as indicated by the arrows, these steps are not necessarily performed in the order indicated by the arrows. Except as explicitly stated herein, the execution of these steps is not strictly limited, and may be performed in other sequences. Moreover, at least some of the steps in the flowchart of the drawings may include a plurality of sub-steps or stages, which are not necessarily performed at the same time, but may be executed at different times, and the order of execution thereof is not necessarily to be performed sequentially, but may be performed alternately or alternately with at least a portion of the sub-steps or stages of other steps or other steps.

The above is only a part of the embodiments of the present invention, and it should be noted that those skilled in the art may also make several improvements and retouching without departing from the principles of the present invention. It should be considered as the scope of protection of the present invention.

The invention claimed is:

1. A method performed by an electronic device, the method comprising:
    acquiring a device control instruction by a user;
    acquiring at least one of user information, environment information, and device information;
    performing intent classification processing based on the acquired information and the device control instruction to determine an execution probability of control function;
    outputting an operation result of rejecting to execute the device control instruction in case that the execution probability of control function is less than a first preset threshold, or otherwise, determining the target function corresponding to the device control instruction based on the execution probability of control function; and
    controlling at least one target device to perform the corresponding operation based on the target function.

2. The method of claim 1,
    wherein the user information comprises user profile information or device control authority information of the user;
    wherein the device information comprises working state information of the device; and
    wherein the environment information comprises working environment information of the device.

3. The method of claim 1, wherein controlling the at least one target device to perform a corresponding operation based on the acquired information and the device control instruction further comprises:
    outputting an operation result of rejecting to execute the device control instruction based on the acquired information and the device control instruction.

4. The method of claim 3, wherein outputting an operation result of rejecting to execute the device control instruction further comprises:
    outputting the operation result of rejecting to execute the device control instruction, when determining that at least one of the following is satisfied according to the acquired information:
    the user possessing no control authority for the at least one target device; the user possessing no control authority for a target function corresponding to the device control instruction; the at least one target device not satisfying an execution condition corresponding to the device control instruction; and a working environment of the at least one target device not satisfying an execution condition corresponding to the device control instruction.

5. The method of claim 1, wherein determining the at least one target device corresponding to the device control instruction further comprises:
    performing domain classification processing based on the acquired information and the device control instruction to obtain an execution probability of each device; and
    outputting the operation result of rejecting to execute the device control instruction if the execution probability of each device is less than a second preset threshold, or otherwise,
    wherein determining the at least one target device corresponding to the device controlling device is based on the execution probability of each device.

6. The method of claim 1, wherein controlling the at least one target device to perform the corresponding operation according to the target parameter information further comprises:
    controlling the at least one target device to perform the corresponding operation according to the target parameter information when satisfying at least one of the following:
    the device control instruction not containing a parameter value; and
    the parameter value contained in the device control instruction does not belong to the parameter value in a parameter value range determined by the acquired information.

7. The method of claim 1, wherein controlling the at least one target device to perform a corresponding operation according to the target parameter information further comprises:
    performing slot tag processing on the device control instruction to obtain the parameter information in the device control instruction;
    determining whether to change the parameter information in the device control instruction based on the parameter information in the device control instruction and the acquired information; and
    if changed, determining the changed target parameter information based on the parameter information in the device control instruction and the acquired information.

8. The method of claim 7, wherein determining whether to change the parameter information in the device control instruction based on the parameter information in the device control instruction and the acquired information further comprises:
    obtaining, by logistic regression processing, a logistic regression result based on the parameter information in the device control instruction and the acquired information; determining whether to change the parameter information in the device control instruction based on the logistic regression result; and wherein determining the changed target parameter information based on the parameter information in the device control instruction and the acquired information further comprises:
obtaining, by linear regression processing, a linear regression result based on the parameter information in the device control instruction and the acquired information; and
determining the changed parameter information based on the linear regression result.

9. The method of claim 7, further comprising:
acquiring multiple training data; and
training, through a target loss function, a processing model for changing the parameter information in the device control instruction based on the acquired training data,
wherein any of the training data of the multiple training data comprises:
the device control information, the parameter information in the device control information, the indication information that whether to change the parameter in the device control instruction, the changed parameter information, the user information, the environment information, and the device information.

10. The method of claim 9, wherein before training the model based on the acquired training data and through the target loss function:
determining the target loss function,
wherein determining the target loss function comprises:
determining a first loss function based on the parameter information in the device control instruction in each training data and the parameter information in the device control instruction predicted by the model;
determining a second loss function based on the information indicating whether the parameter in the device instruction in each training data has been changed and the information indicating whether changed predicted by the model;
determining a third loss function based on the changed parameter information in each training data and the changed parameter information predicted by the model; and
determining the target loss function based on the first loss function, the second loss function, and the third loss function.

11. The method of claim 1, wherein after acquiring at least one of the user information, the environment information and the device information, the method further comprises:
converting discrete information in the acquired information into a continuous dense vector;
determining an information representation vector corresponding to the acquired information, according to the converted continuous dense vector and continuous information in the acquired information; and
controlling the at least one target device to perform the corresponding operation based on the acquired information and the device control instruction,
wherein at least one target device performs an operation based on the information representation vector corresponding to the acquired information and the device control instruction.

12. An apparatus for controlling a device, the apparatus comprising:
a first acquiring module, configured to acquire a device control instruction input by a user and at least one of user information, environment information, and device information; and
a control module, configured to:
perform intent classification processing based on the acquired information and the device control instruction to determine an execution probability of control function;
output an operation result of rejecting to execute the device control instruction in case that the execution probability of control function is less than a first preset threshold, or otherwise, determine the target function corresponding to the device control instruction based on the execution probability of control function; and
control at least one target device to perform the corresponding operation based on the target function.

13. The apparatus of claim 12,
wherein the user information comprises user profile information or device control authority information of the user,
wherein the device information comprises working state information of the device, and
wherein the environment information comprises working environment information of the device.

14. The apparatus of claim 12, wherein the control module, in order to control the at least one target device to perform the corresponding operation based on the acquired information and the device control instruction, is further configured to:
output an operation result of rejecting to execute the device control instruction based on the acquired information and the device control instruction.

15. The apparatus of claim 14, wherein the control module, in order to output the operation result of rejecting to execute the device control instruction, is further configured to:
output the operation result of rejecting to execute the device control instruction, when determining that at least one of the following is satisfied according to the acquired information:
the user possessing no control authority for the at least one target device, the user possessing no control authority for a target function corresponding to the device control instruction, the at least one target device not satisfying an execution condition corresponding to the device control instruction, and a working environment of the at least one target device not satisfying an execution condition corresponding to the device control instruction.

16. The apparatus of claim 12, wherein the control module, in order to determine the at least one target device corresponding to the device control instruction, is further configured to:
perform domain classification processing based on the acquired information and the device control instruction to obtain an execution probability of each device; and
output the operation result of rejecting to execute the device control instruction if the execution probability of each device is less than a first preset threshold, or otherwise, determining at least one target device corresponding to the device controlling device based on the execution probability of each device.

* * * * *